United States Patent
Amin et al.

(10) Patent No.: US 6,936,841 B2
(45) Date of Patent: Aug. 30, 2005

(54) METHODS FOR CONTROLLING QUBITS

(75) Inventors: Mohammad H. S. Amin, Vancouver (CA); Geordie Rose, Vancouver (CA); Alexandre Zagoskin, Vancouver (CA); Jeremy P. Hilton, Vancouver (CA)

(73) Assignee: D-Wave Systems, Inc., Vancouver (CA)

( * ) Notice: Subject to any disclaimer, the term of this patent is extended or adjusted under 35 U.S.C. 154(b) by 0 days.

(21) Appl. No.: 10/791,617

(22) Filed: Mar. 2, 2004

(65) Prior Publication Data

US 2004/0170047 A1 Sep. 2, 2004

Related U.S. Application Data

(63) Continuation of application No. 09/872,495, filed on Jun. 1, 2001, now Pat. No. 6,803,599.

(51) Int. Cl.⁷ .............................. H01L 29/06
(52) U.S. Cl. ........................ 257/31; 257/39
(58) Field of Search ................ 257/31–39; 365/66, 365/160, 161

(56) References Cited

U.S. PATENT DOCUMENTS

| | | | |
|---|---|---|---|
| 4,504,926 A | 3/1985 | Toyoda | |
| 5,323,344 A | 6/1994 | Katayama | |
| 5,787,307 A | 7/1998 | Imoto | |
| 5,917,322 A | 6/1999 | Gershenfeld | |
| 6,495,854 B1 | 12/2002 | Newns | |
| 6,563,311 B2 | 5/2003 | Zagoskin | |
| 6,633,053 B1 | * 10/2003 | Jaeger | 257/14 |
| 6,649,929 B2 | 11/2003 | Newns et al. | |
| 6,753,546 B2 | * 6/2004 | Tzalenchuk et al. | 257/31 |
| 2002/0117656 A1 | 8/2002 | Amin et al. | |
| 2002/0180006 A1 | 12/2002 | Franz et al. | |

FOREIGN PATENT DOCUMENTS

| | | |
|---|---|---|
| EP | 0251568 A1 | 1/1988 |
| EP | 1085422 A2 | 3/2001 |

OTHER PUBLICATIONS

Berggren, K.K. et al., "An Integrated Superconductive Device Technology for Qubit Control," Proceedings of 1st International Conference on Experimental Implementation of Quantum Computation, Jan. 16–19, 2001.*

A. Aassime, G. Johansson, G. Wendin, R. Schoelkopf, and P. Delsing, "Radio–Frequency Single–Electron Transistor as Readout Device for Qubits: Charge Sensitivity and Back-action," *Phys. Rev. Lett.* 86, pp. 3376–3379 (2001).

(Continued)

*Primary Examiner*—Sara Crane
(74) *Attorney, Agent, or Firm*—Jones Day; Brett Lovejoy

(57) ABSTRACT

A control system for an array of qubits is disclosed. The control system according to the present invention provides currents and voltages to qubits in the array of qubits in order to perform functions on the qubit. The functions that the control system can perform include read out, initialization, and entanglement. The state of a qubit can be determined by grounding the qubit, applying a current across the qubit, measuring the resulting potential drop across the qubit, and interpreting the potential drop as a state of the qubit. A qubit can be initialized by grounding the qubit and applying a current across the qubit in a selected direction for a time sufficient that the quantum state of the qubit can relax into the selected state. In some embodiments, the qubit can be initialized by grounding the qubit and applying a current across the qubit in a selected direction and then ramping the current to zero in order that the state of the qubit relaxes into the selected state. The states of two qubits can be entangled by coupling the two qubits through a switch. In some embodiments, the switch that is capable of grounding the qubits can also be utilized for entangling selected qubits.

13 Claims, 18 Drawing Sheets

OTHER PUBLICATIONS

D.V. Averin, "Adiabatic Quantum Computation with Cooper Pairs," *Solid State Communications* 105, pp. 659–664 (1998).

G. Blatter, V.B. Geshkenbein, and L.B. Ioffe, "Design aspects of superconducting–phase quantum bits," *Phys. Rev. B* 63, pp. 17451/1–9 (2001).

G. Blatter, V.B. Geshkenbein, M.V. Feigel'man, A.L. Faucheàre, and L.B. Ioffe, "Quantum Computing with Superconducting Phase Qubits," *Physica C* 352; pp. 105–109 (2001).

Mark F. Bocko, Andrea M. Herr, and Marc J. Feldman, "Prospect for Quantum Coherent Computation Using Superconducting Electronics," *IEEE Transactions on Applied Superconductivity* 7, pp. 3638–3641 (1997).

F. Benatti, et al., "Testing Macroscopic Quantum Coherence," *IL Nuovo Cimento B* 110, No. 5–6, pp. 593–610 (1995).

A. Blais, and A.M. Zagoskin, "Operation of universal gates in a solid–state quantum computer based on clean Josephson junctions between d–wave superconductors," *Phys. Rev. A* 61, 042308 (2000), pp. 042308/1–4.

H.–J. Briegel, W. Dür, J.I. Cirac, P. Zoller, "Quantum repeaters for communication", arXiv.org:quant–ph/9803056, pp. 1–8 (1998), website last accessed on Dec. 18, 2001.

R. de Bruyn Ouboter, A.N. Omelyanchouk, and E.D. Vol, "Multi–terminal SQUID controlled by the transport current," *Physica B* 205, pp. 153–162 (1995).

G. Costabile, R. Monaco, and S. Pagano, "rf–Induced steps in intermediate length Josephson–tunnel junctions," *J. Appl. Phys.* 63, pp. 5406–5410 (1988).

M.J. Feldman, "Digital Applications of Josephson junctions," Preprint submitted to *Progress of Theoretical Physics (Japan)*, pp. 1–16 (1997).

R. Feynman, "Simulating physics with computers," *International Journal of Theoretical Physics* 21, pp. 467–488 (1982).

J. Friedman, V. Patel, W. Chen, S.K. Tolpygo, and J.E. Lukens, "Quantum super–position of distinct macroscopic states," *Nature* 406, pp. 43–46 (2000).

M. Götz, V.V. Khanin, H. Schulze, A.B. Zorin, J. Niemeyer, E. Il'ichev, A. Chwala, H.E. Hoenig, H.–G. Meyer, "Harmonic current–phase relation in Nb—Al–based superconductor/normal conductor/superconductor–type Josephson junctions between 4.2 K and the critical temperature," *Appl. Phys. Lett.* 77, pp. 1354–1356 (2000).

L. Grover, "A fast quantum mechanical algorithm for database search," *Proceedings of the 28th Annual ACM Symposium on the Theory of Computing*, pp. 212–219 (1996).

L. Ioffe, V. Geshkenbein et al., "Environmentally decoupled sds–wave Josephson junctions for quantum computing," *Nature* 398, pp. 679–681 (1999).

J.A. Jones, M. Mosca, and R. H. Hansen, "Implementation of a quantum search algorithm on a quantum computer," *Nature* 393, pp. 344–346 (1998).

P. Jonker, and J. Han, "On Quantum & Classical Computing with Arrays of Superconducting Persistent Current Qubits," *Proceedings Fifth IEEE International Workshop on Computer Architectures for Machine Perception*, Padova, Italy, Sep. 11–13, 2000, pp. 69–78.

A. Kitaev, "Quantum measurements and the Abelian Stabilizer Problem," arXiv:quant–ph/9511026, pp. 1–22 (1995), website last accessed on Jun. 5, 2003.

E. Knill, R. Laflamme, and W. Zurek, "Resilient Quantum Computation," *Science* 279, pp. 342–345 (1998).

A.N. Korotkov and M.A. Paalanen, "Charge Sensitivity of Radio–Frequency Single Electron Transistor," *Appl. Phys. Lett.* 74, pp. 4052–4054 (1999).

Y. Makhlin, G. Schön, and A. Shnirman, "Quantum–State Engineering with Josephson–Junction Devices," *Reviews of Modern Physics*, vol. 73, pp. 357–400 (2001).

Y. Makhlin et al., "Nano–electronic Circuits as Quantum Bits," 2000 IEEE International Symposium on Circuits and Systems, Emerging Technologies for the $21^{st}$ Century, Geneva, Switzerland, Mar. 28–32, 2000, pp. 241–244, vol. 2.

J.E. Mooij, T.P. Orlando, L. Levitov, L. Tian, C.H. van der Wal, and S. Lloyd, "Josephson Persistent–Current Qubit," *Science* 285, pp. 1036–1039 (1999).

Y. Nakamura, Yu. A. Pashkin and J. S. Tsai, "Coherent control of macroscopic quantum states in a single–Cooper–pair box," *Nature* 398, pp. 786–788 (1999).

T.P. Orlando, J.E. Mooij, L. Tian, C.H. van der Wal, L.S. Levitov, S. Lloyd, and J.J. Mazo, "Superconducting persistent current qubit," *Physical Review B* 60, pp. 15398–15413 (1999).

R.C. Rey–de–Castro, M.F. Bocko, A.M. Herr, C.A. Mancini, and M.J. Feldman, "Design of an RSFQ Control Circuit to Observe MQC on an rf–SQUID," *IEEE Transactions on Applied Superconductivity* 11, pp. 1014–1017 (2001).

R.J. Schoelkopf, P. Wahlgren, A.A. Kozhevnikov, P. Delsing, and D.E. Prober "The Radio–Frequency Single–Electron Transistor (RF–SET): A Fast and Ultrasensitive Electrometer," *Science* 280, pp. 1238–1242 (1998).

P. Shor, "Polynomial–Time Algorithms for Prime Factorization and Discrete Logarithms on a Quantum Computer," *SIAM Journal on Computing* 26, pp. 1484–1509 (1997).

L.M.K. Vandersypen, M. Steffen, G. Breyta, C. S. Yannoni, R. Cleve and I.L. Chuang, "Experimental realization of order–finding with a quantum computer," arXiv.org:quant–ph/0007017, pp. 1–4 (2000).

C. van der Wal, A. ter Haar, F. K. Wilhelm, R. N. Schouten, C. Harmans, T. Orlando, S. Lloyd, and J. Mooij, "Quantum Superposition of Macroscopic Persistent–Current States," *Science* 290, pp. 773–777 (2000).

A. Wallraff, Yu. Koval, M. Levitchev, M. V. Fistul, and A. V. Ustinov, "Annular Long Josephson Junctions in a Magnetic Field: Engineering and Probing the Fluxon Interaction Potential," *J. Low Temp. Phys.* 118, pp. 543–553 (2000).

Communication Under Rule 51(4) EPC for European Application No. 02732272.6–2201, dated Mar. 10, 2005, 6 pages.

\* cited by examiner

METHODS FOR CONTROLLING QUBITS

This application is a continuation of Ser. No. 09/872,495, filed Jun. 1, 2001, now U.S. Pat. No. 6,803,599.

BACKGROUND

1. Field of the Invention

This invention relates to quantum computing and, in particular, to a control system for performing operations on a quantum qubit.

2. Description of Related Art

Research on what is now called quantum computing traces back to Richard Feynman, See, e.g., R. Feynman, Int. J. Theor. Phys., 21, 467–488 (1982). Feynman noted that quantum systems are inherently difficult to simulate with classical (i.e., conventional, non-quantum) computers, but that this task could be accomplished by observing the evolution of another quantum system. In particular, solving a theory for the behavior of a quantum system commonly involves solving a differential equation related to the Hamiltonian of the quantum system. Observing the behavior of the quantum system provides information regarding the solutions to the equation.

Further efforts in quantum computing were initially concentrated on "software development" or building of the formal theory of quantum computing. Software development for quantum computing involves attempting to set the Hamiltonian of a quantum system to correspond to a problem requiring solution. Milestones in these efforts were the discoveries of the Shor and Grover algorithms. See, e.g., P. Shor, SIAM J. of Comput., 26:5, 1484–1509 (1997); L. Grover, Proc. 28th STOC, 212–219 (1996); and A. Kitaev, LANL preprint quant-ph/9511026 (1995). In particular, the Shor algorithm permits a quantum computer to factorize large numbers efficiently. In this application, a quantum computer could render obsolete all existing "public-key" encryption schemes. In another application, quantum computers (or even a smaller scale device such as a quantum repeater) could enable absolutely safe communication channels where a message cannot be intercepted without being destroyed in the process. See, e.g., H. J. Briegel, W. Dur, J. I. Cirac, P. Zoller, LANL preprint quant-ph/9803056 (1998).

Showing that fault-tolerant quantum computation is theoretically possible opened the way for attempts at practical realizations of quantum computers. See, e.g., E. Knill, R. Laflamme, and W. Zurek, Science, 279, p. 342 (1998). One proposed application of a quantum computer is factoring of large numbers. In such an application, a quantum computer could render obsolete all existing encryption schemes that use the "public key" method. In another application, quantum computers (or even a smaller scale device such as a quantum repeater) could enable absolutely safe communication channels where a message, in principle, cannot be intercepted without being destroyed in the process. See, e.g., H. J. Briegel et al., LANL preprint quant-ph/9803056 (1998).

Quantum computing generally involves initializing the states of N qubits (quantum bits), creating controlled entanglements among the N qubits, allowing the states of the qubit system to evolve, and reading the qubits afterwards. A qubit is conventionally a system having two degenerate (of equal energy) quantum states, with a non-zero probability of the system being found in either state. Thus, N qubits can define an initial state that is a combination of $2^N$ classical states. This entangled initial state will undergo an evolution, governed by the interactions which the qubits have both among themselves and with external influences. This evolution defines a calculation, in effect $2^N$ simultaneous classical calculations, performed by the qubit system. Reading out the qubits after evolution is complete determines their states and thus the results of the calculations.

Several physical systems have been proposed for the qubits in a quantum computer. One system uses molecules having degenerate nuclear spin states, see N. Gershenfeld and I. Chuang, "Method and Apparatus for Quantum Information Processing", U.S. Pat. No. 5,917,322. Nuclear magnetic resonance (NMR) techniques can read the spin states. These systems have successfully implemented a search algorithm, see, e.g., M. Mosca, R. H. Hansen, and J. A. Jones, "Implementation of a quantum search algorithm on a quantum computer," Nature, 393:344–346, 1998 and the references therein, and a number ordering algorithm, see, e.g., Lieven M. K. Vandersypen, Matthias Steffen, Gregory Breyta, Costantino S. Yannoni, Richard Cleve and Isaac L. Chuang, "Experimental realization of order-finding with a quantum computer," Los Alamos preprint quant-ph/0007017 (2000). The number ordering algorithm is related to the quantum fourier transform, an essential element of both Shor's algorithm for factoring of a natural number and Grover's Search Algorithm for searching unsorted databases. However, efforts to expand such systems to a commercially useful number of qubits face difficult challenges.

One method for determining the state of a radio-frequency superconducting quantum interference device (RF-SQUID) qubit (another type of phase qubit) involves rapid single flux quantum (RSFQ) circuitry See Roberto C. Rey-de-Castro, Mark F. Bocko, Andrea M. Herr, Cesar A. Mancini, Marc J. Feldman, "Design of an RSFQ Control Circuit to Observe MQC on an rf-SQUID," EEE Trans. Appl. Supercond, 11, 1014 (March 2001). A timer controls the readout circuitry and triggers the entire process with a single input pulse, producing an output pulse only for one of the two possible final qubits states. The risk of this readout method lies in the inductive coupling with the environment causing decoherence or disturbance of the qubit during quantum evolution. The readout circuitry attempts to reduce decoherence by isolating the qubit with intermediate inductive loops. Although this may be effective, the overhead is large, and the overall scalability is limited.

One physical implementation of a phase qubit involves a micrometer-sized superconducting loop with 3 or 4 Josephson junctions. See J. E. Mooij, T. P. Orlando, L. Levitov, Lin Tian, Caspar H. van der Wal, and Seth Lloyd, "Josephson Persistent-Current Qubit", Science 1999 Aug. 13; 285: 1036–1039. The energy levels of this system correspond to differing amounts of magnetic flux threading the superconducting loop. Application of a static magnetic field normal to the loop may bring two of these levels (or basis states) into degeneracy. Typically, external AC electromagnetic fields are applied, to enable tunneling between non-degenerate states.

Further, currently known methods for entangling qubits also are susceptible to loss of coherence. Entanglement of quantum states of qubits can be an important step in the application of quantum algorithms. See for example, P. Shor, SIAM J. of Comput., 26:5, 1484–1509 (1997). Current methods for entangling phase qubits require the interaction of the flux in each of the qubits, see Yuriy Malhlin, Gerd Schon, Alexandre Shnirman, "Quantum state engineering with Josephson-junction devices," LANL preprint, cond-mat/0011269 (November 2000). This form of entanglement is sensitive to the qubit coupling with surrounding fields which cause decoherence and loss of information.

As discussed above, currently proposed methods for readout, initialization, and entanglement of a qubit involve detection or manipulation of magnetic fields at the location of the qubit, which make these methods susceptible to decoherence and limits the overall scalability of the resulting quantum computing device. Thus, there is a need for an efficient implementation and method that minimizes decoherence and other sources of noise and maximizes scalability.

SUMMARY OF THE INVENTION

In accordance with the present invention, a quantum computing system includes a control system which utilizes currents and voltages for performing operations on qubits. The operations performed on the qubits can include reading the state of the qubit, initializing the state of the qubit, and entangling the state of the qubit with the states of other qubits in the quantum computing system. In some embodiments, the qubits include permanent readout superconducting qubits (PRSQs). Embodiments of the invention, however, can include any phase qubit.

In some embodiments of the invention, the control system is capable of grounding a phase qubit. Grounding the phase qubit freezes the quantum tunneling between the two degenerate states. When the qubit is grounded, electrons freely move between the qubit and the ground, thus collapsing the wavefunction of the supercurrent into one of the ground states $\pm\Phi_0$, having a definite magnetic moment. Thus, while the grounding connection is open, the qubit remains in that state to be read. In some embodiments, the control includes a single electron transistor or parity key that couples the qubit to ground. By modulating the voltage on the single electron transistor (SET), the circuit can be opened and closed, and furthermore, the SET can be tuned for a single electron or a Cooper pair (pair of electrons) depending on the particular qubit.

In some embodiments of the invention, the control system can apply current through the qubit in order to read the quantum state of the qubit. Degeneracy in the ground states of the qubit means that if a current is driven through the qubit, the flux will behave differently depending on the quantum state of the qubit when grounded (ie, $\pm\Phi_0$). Since the voltage across the qubit is proportional to the derivative of the quantum flux in the qubit with respect to time, which is dependent on the quantum state of the qubit, the resulting voltage across the qubit will also be different depending on the state of the qubit. Therefore, the quantum state of the qubit can be read by grounding the qubit and driving a current through the qubit while measuring the resulting voltage across the qubit. The measured voltage across the qubit indicates one of the states of the qubit.

In some embodiments of the invention, the control system can initialize the qubit to occupy one of its basis states. The bistability of the ground state in the qubit occurs when the current through the qubit is zero, where the classical basis states of the qubit are $\pm\Phi_0$. By driving current across the qubit in a particular direction, a first state can be selected, and conversely, by driving a current across the qubit in the opposite direction a second state can be selected. Therefore, a control system according to the present invention can initialize a first state by driving current across the qubit in a first direction and can initialize a second state by driving current across the qubit in a second direction opposite from the first direction.

Further, in some embodiments a control system according to the present invention can control entanglements between quantum states of qubits in the quantum computing system. Once a qubit has been initialized and released from the fixed state, it becomes free to evolve quantum mechanically. The evolving wavefunction stores the quantum information of the qubit as a superposition of states. In order to entangle qubits, the evolving wavefunctions are allowed to overlap.

In some embodiments of the invention, a qubit system can consist of a 2-dimensional grid of individual phase qubits. For example, a grid can have N rows and M columns of qubits, wherein each index can have a phase qubit. Each row of the grid can have at least one line for application of a current, and at least one line for grounding operations. Similarly, each column of the grid can have at least two lines for application of a voltage. In a qubit system, each qubit in a column could have a qubit switch, such that application of a voltage to the switch could effectively close the switch, thus allowing current to pass when the qubit is grounded. Each qubit could have a grounding switch connecting the qubit to a grounding mechanism, such that a voltage applied to the switch will close the switch and ground the qubit. Each row in the qubit system could have a current line such that application of a current (or supercurrent) to the line, will flow through the qubit to ground when the qubit switch and grounding switch are closed. Furthermore, a mechanism for measuring the potential drop can be placed between each respective current line and ground line for measuring the potential drop between the two. Some embodiments of the invention can have the described current, voltage, and ground lines reversed by column and row respectively, or could otherwise have some combination of current and voltage lines for a given row or column.

These and other embodiments are further described below with respect to the following figures.

DETAILED DESCRIPTION

Figure 1:
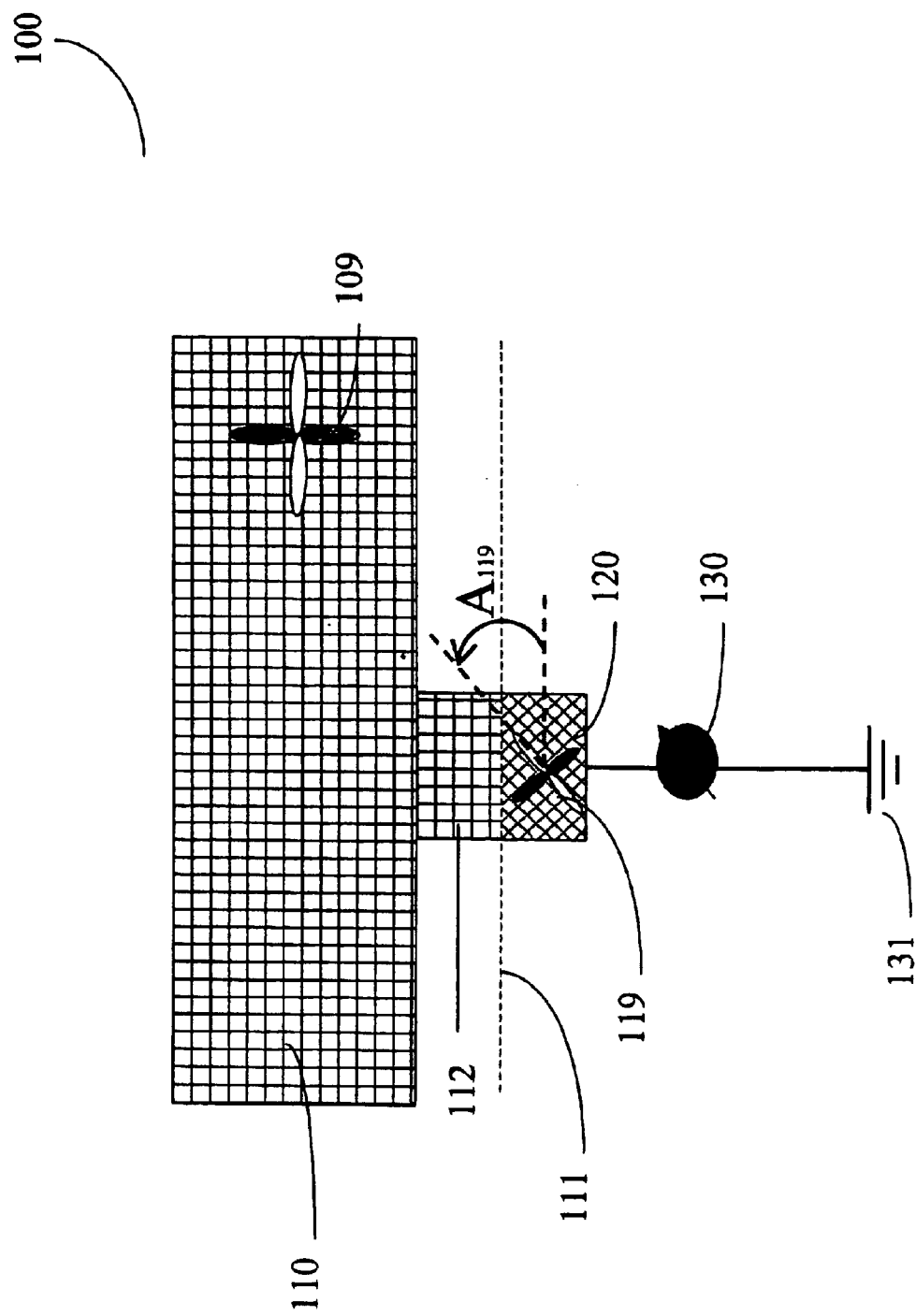
FIG. 1 shows an embodiment of a permanent readout superconducting qubit.

FIG. 1 shows an embodiment of a phase qubit 100. For illustrative purposes, phase qubit 100 is shown as a permanent readout superconducting qubit in FIGS. 1–18. However, phase qubit 100 can be any phase qubit including, for example, a micrometer-sized superconducting loop with several Josephson junctions and a radio-frequency superconducting quantum interference device (RF-SQUID).

A permanent readout superconducting qubit (PRSQ) design was first disclosed by Alexandre Zagoskin, U.S. patent application Ser. No. 09/452749, "Permanent Readout Superconducting Qubit", filed Dec. 1, 1999, which is herein included by reference in its entirety. In some embodiments, a PRSQ such as qubit 100 of FIG. 1 consists of a bulk superconductor 110, a grain boundary 111, a mesoscopic island 120 (i.e., an island that has a size such that a single excess Cooper pair is measurable), and a connection which can be grounded to ground qubit 100. The material utilized in fabricating the PRSQ can be a high-$T_c$ superconductor having a pairing symmetry that contains a dominant component with non-zero angular moment, and a sub-dominant component that can have any pairing symmetry. The resulting qubit has the basis states $\pm\Phi_0$, where $\Phi_0$ is a quantum of phase, with respect to the phase, $\Phi$, of the bulk superconductor.

Qubit 100 includes bulk superconductor 110, a superconducting finger 112 extending across grain boundary 111, superconducting mesoscopic island 120, and a grounding switch 130 coupled between superconducting island 120 and ground 131. Bulk superconductor 110 can be fabricated from a superconducting material with a dominant pairing symmetry having a non-zero angular moment. The angle of crystal orientation of bulk superconductor 110 is related to the orientation of the superconducting order parameter $A_{109}$ and is illustrated by wave function 109. Similarly, mesoscopic island 120 is made of a superconducting material with a dominant pairing symmetry having a non-zero angular moment. The crystal orientation of island 120 is mismatched with respect to the crystal orientation of bulk superconductor 110 by an angle $Al_{119}$. The orientation of the order parameter is in part determined by the crystal orientation, thus wave function 119 is effectively rotated with respect to wave function 109 as well. This misalignment in the order parameters in island 120 and bulk material 110 results in time-reversal symmetry breaking in the supercurrent at the grain boundary between bulk material 110 and island 120. The angle of mismatch $A_{119}$ between wave function 109 and wave function 119 can vary and is dependent upon the embodiment of the invention. In an embodiment where $Al_{119}$ is 45°, the spontaneous current at the grain boundary is maximized.

Although the states of qubit 100 are stored in the double degeneracy of the flux, the area in which the flux is maintained is much more localized than in alternate phase qubit designs. Thus the PRSQ is naturally less susceptible to coupling with external magnetic fields and other sources of decoherence.

Single qubit operations on asymmetric qubits such as qubit 100 can be performed by modulating the transport current through qubit 100 (i.e., between island 120 and bulk material 110). Setting the transport current $I_T$ to zero sets the effective Hamiltonian describing the quantum system of qubit 100 proportional to $\hat{\sigma}_x$, which is referred to as a Pauli matrix. In the basis where the qubit basis states $|0\rangle$ and $|1\rangle$ are chosen so that the state $|0\rangle$ corresponds to the vector (1,0) and the state $|1\rangle$ corresponds to the vector (0,1), $$\hat{\sigma}_x = \begin{bmatrix} 0 & 1 \\ 1 & 0 \end{bmatrix}.$$

This basis can be called the Z-diagonal basis. In this basis the Pauli matrix $\hat{\sigma}_x$ rotates one of the basis states into the other basis state (i.e., $\hat{\sigma}_x|0\rangle=|1\rangle$ and $\hat{\sigma}_x|1\rangle=|0\rangle$).

The effective Hamiltonian describing the qubit system of qubit 100 includes a term proportional to $\Delta_T(I)\hat{\sigma}_x$, where the tunneling matrix element $\Delta_T(I)$ can be varied over a large range depending on the Coulomb energy and the Josephson energy of the qubit system of qubit 100. In some embodiments, the tunneling amplitude is on the order of 10 GHz. In order to successfully implement quantum algorithms, operations performed on qubit 100 should have a larger frequency than the tunneling amplitude, or the quantum system of qubit 100 can become unpredictable. For example, if the frequency of grounding switch 130 is slower than the tunneling amplitude of qubit 130, then the state of qubit 100 can evolve between the time the ground was applied and the actual time the ground was realized in qubit 100.

In order to achieve the scale required for useful quantum computing, all sources of decoherence in the qubit system should be minimized. Phase qubits with delocalized magnetic fields limit their overall scalability due to undesired coupling between individual qubits, as well as the more detrimental coupling with the surrounding environment. If qubit 100 is a phase qubit made out of a superconducting ring, there can be a tendency towards inductively coupling to the surrounding environment. A system involving qubits fabricated from superconducting rings, then, should be spaced apart such that the inductance with other qubits and surrounding current carrying circuitry is minimized. Some proposed embodiments of phase qubits have low inductance and therefore low inherent coupling to surrounding circuitry.

A permanent readout superconducting qubit (PRSQ), such as qubit 100 of FIG. 1, disclosed by A. Zagoslin, can provide close-spaced qubits because of the reduced undesired inductive coupling between qubits. Qubit 100 stores state information in highly localized phases and persistent currents, thus minimizing any potential coupling effects with adjacent qubits. The low inductance in Qubit 100 can allow adjacent qubits to be placed with closer spacing, and still allow for surrounding control system circuitry.

Figure 2:
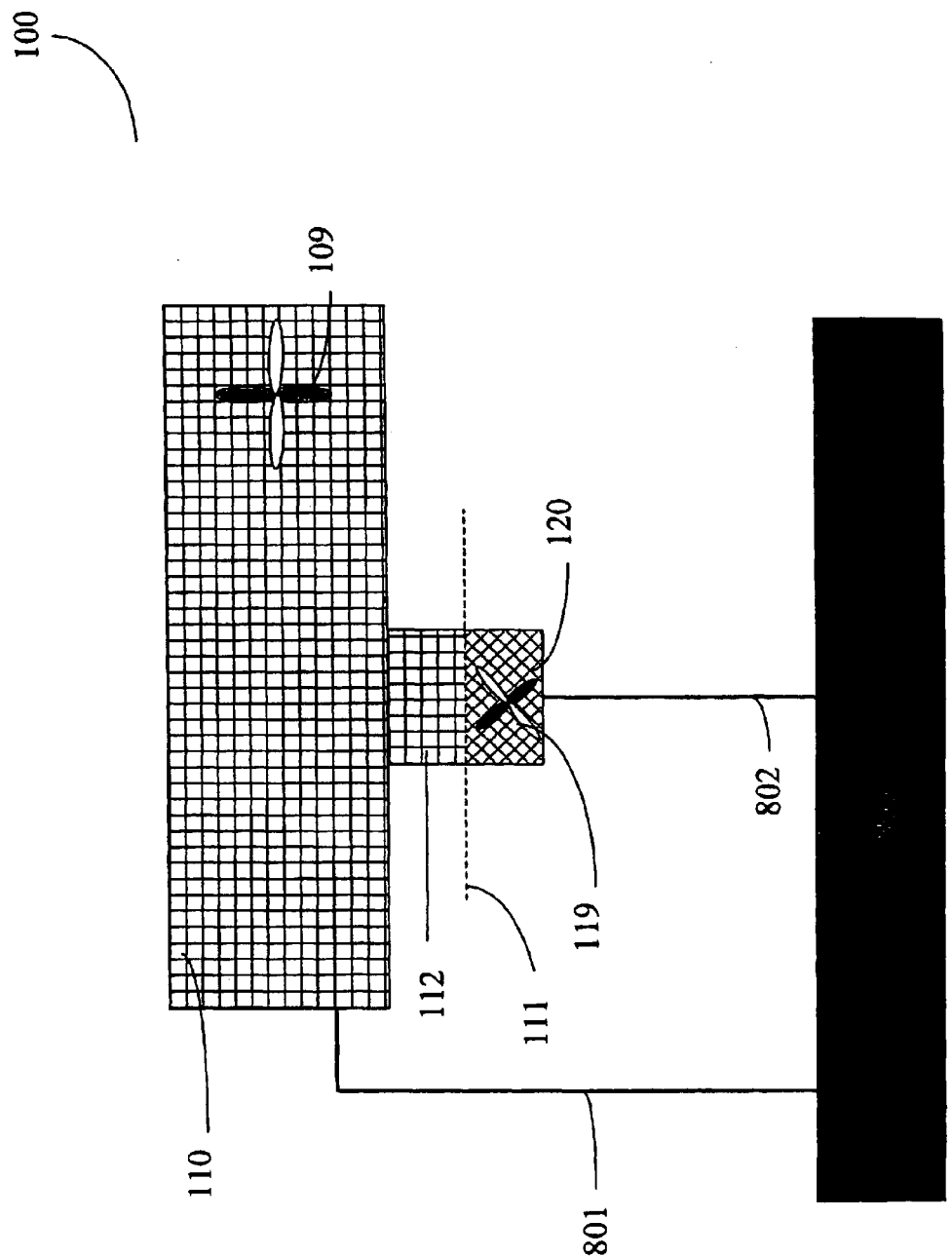
FIG. 2 shows a permanent readout superconducting qubit (PRSQ) with a control system.

FIG. 2 shows qubit 100 coupled with a control system 800. Control system 800 can be coupled to bulk superconductor 110, for example through line 801, and to island 120, for example through line 802. Control system 800 can provide currents through qubit 100 and can ground qubit 100 in order to read the quantum states of qubit 100 or initiate quantum states of qubit 100.

Control system 800 can read out the state of qubit 100 by grounding qubit 100 applying a current across qubit 100 measuring a voltage across qubit 100 and interpreting the quantum state of qubit 100 based on the measured voltage. When the quantum state of qubit 100 is evolving quantum mechanically, the states of qubit 100 are in a superposition of the two degenerate quantum states. When qubit 100 is grounded, the wavefunction collapses into one of the two available degenerate basis states. As a current is applied across qubit 100 the flux, which defines the basis state (i.e., either the |0> or |1> basis states) of qubit 100, changes from a ground state to an excited state. Since voltage is dependent upon the derivative of the flux with respect to time, a voltage results that is dependent upon the state of qubit 100 at the time of grounding. If the flux (qubit state) occupies a first state at the time of grounding, then a set of voltage pulses can be detected, whereas, if the flux occupies a second state at the time of grounding, a single voltage pulse will result. Moreover, the detectable voltage pulses can be resolved in time, thus illuminating a method for differentiating between the states of the qubit.

An embodiment of a method of reading out the state of a qubit can include, grounding a qubit, applying a current pulse across said qubit to ground, and measuring a potential across said qubit with respect to ground. The potential drop can be in the form of one or more pulses, whereby the temporal position of the pulses, with respect to the initial passing of current across the current, can be resolved. In an embodiment of a method for reading out the state of the qubit, a potential measurement can be made for a fixed duration of time with respect to the passing of current across the qubit. Correlation of the qubit state can then be made based on the presence or absence of a change in the potential measured across the qubit during said time period.

The theoretical I-V characteristics of superconducting materials have shown a range over which current flowing in the superconductor can vary, typically between $\pm I_c$, where the voltage is zero. $I_c$ is thus called the critical current in the superconductor material. For values of current beyond the critical current, dynamical processes occur and the superconducting material becomes resistive. In the non-ideal case, the supercurrent range, $\pm I_c$, is not associated with a zero voltage across qubit 100 but a near zero voltage, typically offset by a subgap resistance. Therefore, in order to readout a classical state of qubit 100, a current at or less than the critical current of the system may be applied.

Application of current across junction 111 of qubit 100 has the effect of biasing the ground states of qubit 100, effectively removing the degeneracy of the degenerate ground states of qubit 100. One of the degenerate ground states, then, becomes more energetically favorable than the other. If the applied current exceeds the critical current of qubit junction 111, then the energy of the quantum states on qubit 100 escapes the potential well and a runaway flux or finite voltage results. Since the bias current removes the double degeneracy of the ground states in qubit 100, the critical current in superconducting qubit 100 will be dependent upon the quantum state of qubit 100. For example, if a bias current energetically favors a first state, and grounded qubit 100 occupies that first state, then the critical current is $I_{c1}$, and if the grounded qubit 100 occupies a second state, then the critical current is $I_{c2}$. The values of state dependent critical currents are dependent upon the embodiment of qubit 100, but by selecting an appropriate tunnel barrier height in the potential well, the values of $I_{c1}$ and $I_{c2}$ can be made distinct. The height of the tunneling barrier in the potential energy of qubit 100 can be adjusted by tuning the tunneling amplitude of the qubit. This can be accomplished, for example, by tuning the capacitance of qubit 100.

If the critical currents $I_{c1}$ and $I_{c2}$ are already known, then by applying a bias current with a magnitude between the two critical currents, for example at $(I_{c1}+I_{c2})/2$, then the quantum state of qubit 100 may be determined by measuring the resulting potential drop across qubit 100 (i.e., between island 120 and superconducting substrate 110). If, for example, $I_{c1}$, is the lower of the two critical currents, and the quantum system of qubit 100 corresponds to the quantum state with critical current $I_{c1}$, then the applied current will exceed the critical current of the system and dynamical effects will result in a measurable voltage across qubit 100. Alternatively, if the quantum state of qubit 100 corresponds to the quantum state with critical current $I_{c2}$, then the applied current will not exceed the critical current of the system, and measuring the potential drop across qubit 100 will only indicate a small voltage associated with the subgap resistance.

Therefore, control system 800 can read out the quantum state of qubit 100 by grounding qubit 100 (i.e., coupling island 120 to ground), applying a bias current across qubit 100, the bias current being of a magnitude between the critical currents associated with the quantum states of qubit 100, and measuring the potential drop across qubit 100.

Qubit control system 800 of FIG. 2, then, can include circuits for reading out the quantum state of qubit 100. Qubit control system 800 can have one control branch 801 coupled to bulk superconductor 110 and a second control branch 802 coupled to island 120 of qubit 100. Control system 800 then, can perform a readout procedure by grounding qubit 100 through control line 802, applying a current to bulk superconductor 110 through control branch 801, and measuring the potential drop across control branch 801 and the qubit branch 802. The current is a supercurrent of Cooper pairs. Thus, synchronized with the application of current to grounded qubit 100, control system 800 measures the voltage across qubit 100. Control system 800 then interprets the measured potential drop as indicating one of the possible states of qubit 100. Control system 800 can then communicate the measured quantum state of qubit 100 to another system (not shown) that interfaces with qubit control system 800.

Control system 800 can provide an automatic readout method in an integrated circuit manner. Furthermore, control system 800 easily generalizes to an array of qubits, whereby a readout method could be applied to each of the qubits in the array of qubits in succession. Qubit control system 800 provides an interface which further helps to isolate a qubit system that includes qubit 100 from the surrounding environment. An external system could, then, interact with control system 800, and not directly with qubit 100.

In some embodiments of the invention, control system 800 can be calibrated. The state specific critical currents of qubit 100 can be first determined as a calibration of the bias current to be applied during the readout of the quantum state of qubit 100. The readout procedure discussed above can then be performed where the applied bias current is between the bounding critical currents corresponding to the two quantum states. Measuring the potential across qubit 100 would then indicate which state is present in qubit 100. In some embodiments, the appropriate bias current can be stored by a system that interfaces with control system 800.

Figure 3:
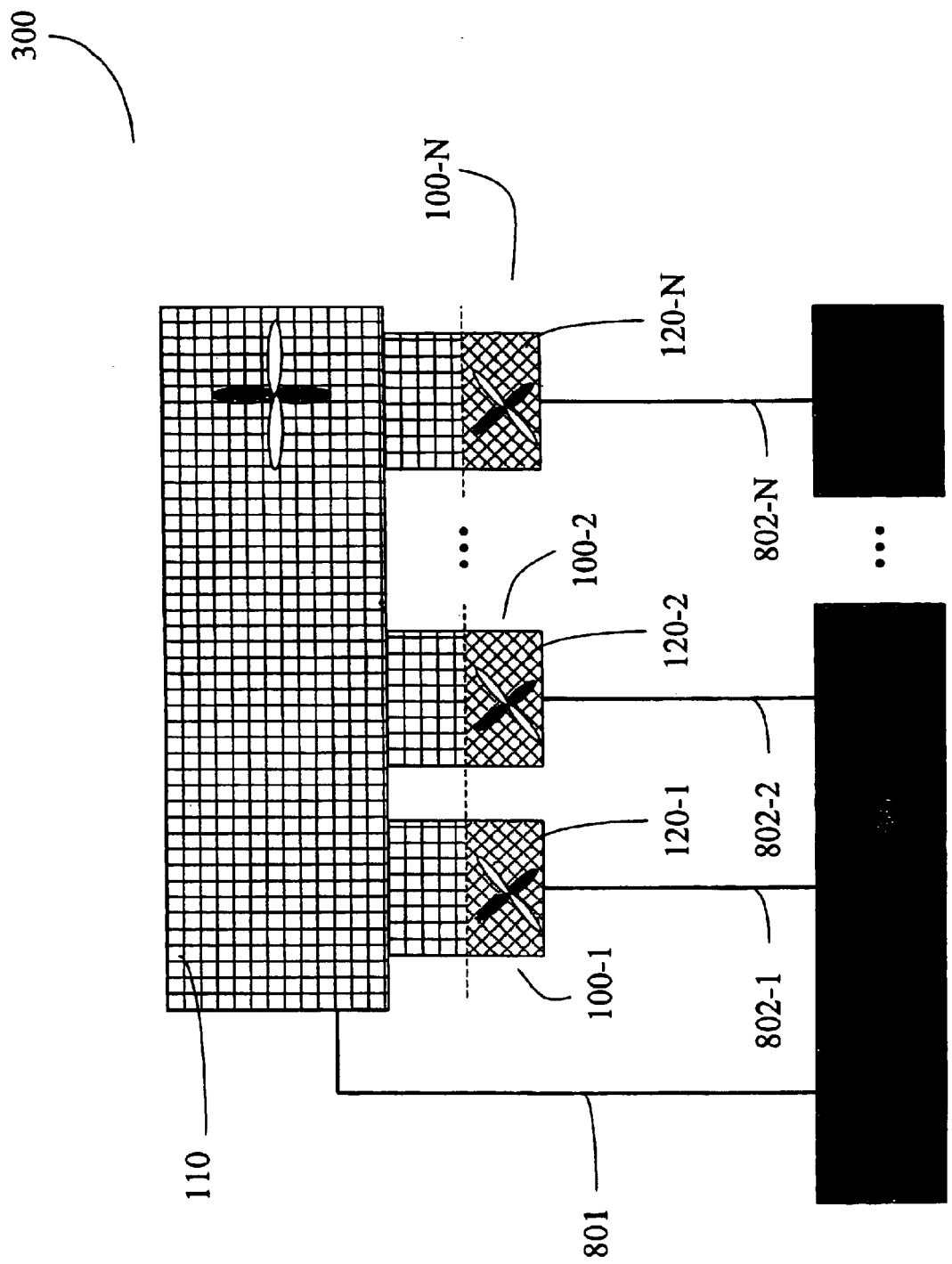
FIG. 3 shows an array of qubits with a control system according to the present invention.

FIG. 3 shows an embodiment of a qubit array 300 with control system 800 coupled to qubit array 300. Qubit array 300 includes qubits 100-1 through 100-N. As described above, a single control branch 801 is coupled to superconducting substrate 110, which is common to qubits 100-1 through 100-N. Qubit branches 802-1 through 802-N are coupled to islands 120-1 through 120-N, respectively. Control system 800 can perform readout procedures as described above on each of qubits 100-1 through 100-N. In some embodiments, during a readout procedure on one of qubits 100-1 through 100-N, the qubit being read is grounded while the remaining ones of qubits 100-1 through 100-N are not grounded. The potential drop taken across control branch 801 and the grounded qubit branch can be measured and interpreted by control system 800 in order to determine the quantum state of the qubit being read.

Figure 4:
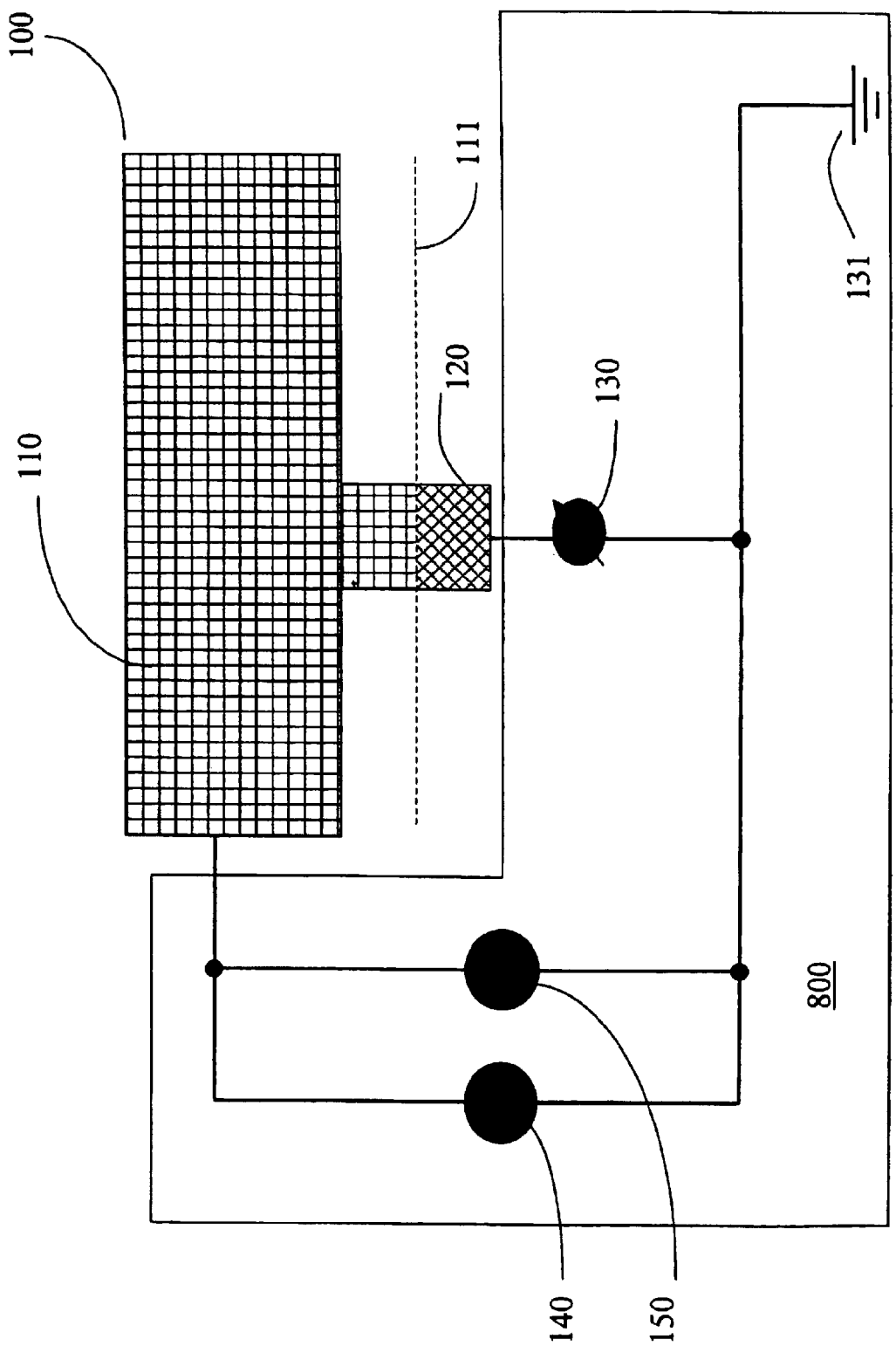
FIG. 4 shows an embodiment of a control system according to the present invention that includes readout control circuitry, which is coupled to a qubit.

In some embodiments of control system 800, a simultaneous readout of the quantum register represented by qubit array 300 is performed. In some embodiments, each of qubits 100-1 through 100-N in qubit system 300 can be grounded simultaneously and readout in turn. In some embodiments, only one of qubits 100-1 through 100-N to be read out is grounded while the remaining ones of qubits 100-1 through 100-N in qubit system 300 continue to evolve quantum mechanically. However, by knowing the tunneling amplitude of qubits 100-1 through 100-N in qubit system 300, the evolution can be predicted and the exact time at which the one of qubits 100-1 through 100-N next to be read will again be in the required state can be determined. Therefore, in some embodiments, a method for reading out the state of a quantum register system 300 includes a timing mechanism, whereby each consecutive qubit of qubits 100-1 through 100-N will be read at corresponding intervals that correlate with a return to the required state of each of qubits 100-1 through 100-N. FIG. 4 shows an embodiment of control system 800 coupled to qubit 100. Control system 800 includes a grounding switch 130, a current source 140, and a voltmeter 150. Grounding switch 130 can couple island 120 to ground. Current source 140 is coupled to provide current to bulk superconductor 110. Voltmeter 150 is coupled to measure the potential drop between ground and bulk superconductor 110. If grounding switch 130 is closed, the circuit that includes grounding switch, current source 140, bulk superconductor 110, and mesoscopic island 120 is completed and current will flow across qubit 100. Furthermore, voltmeter 150 is coupled in parallel with qubit 100 between bulk superconductor 110 and ground 131 such that when grounding switch 130 is closed, voltmeter 150 measures the potential across qubit 100.

In some embodiments switch 130 can be a single electron transistor or parity key that can couple island 120 to ground. By modulating the voltage on the single electron transistor (SET)s, control system 800 can open or close the grounding connection. The behavior of SETs is well defined and is discussed in detail in P Joyez et al., "Observation of Parity-Induced Suppression of Josephson Tunneling in the Superconducting Single Electron Transistor," Physical Review Letters, Vol. 72, No. 15, 11 Apr. 1994, herein incorporated by reference in its entirety.

In some embodiments of the invention, the state specific critical current values generated by current source 140 for qubit 100 is calibrated and used to characterize the magnitude of the bias current. In some embodiments, the bias current for each of the qubits in the qubit system is determined and stored in a system that interfaces with control system 800.

In some embodiments, voltmeter 150 can be a radio-frequency single electron transistor, capable of measuring a magnitude on the order of microvolts on a time-scale of picoseconds. See i.e., R. J. Schoelkopf, P. Wahlgren, A. A. Kozhevnikov, P. Delsing, D. E. Prober "The Radio-Frequency Single-Electron Transistor (RF-SET): A Fast and Ultrasensitive Electrometer", Science, 280, 1238 (May 1998), herein incorporated by reference in its entirety.

A readout method using the embodiment of control system 800 shown in FIG. 4 includes grounding qubit 100 through grounding switch 130, applying a bias current through current source 140, measuring the potential drop across qubit 100 in voltmeter 150, and interpreting the measured potential drop to determine the quantum state of qubit 100. In some embodiments, voltmeter 150 may be calibrated to output directly the measured quantum state of qubit 100. In some embodiments, other portions of control system 800 are calibrated to receive the voltage measurement from voltmeter 150 and determine the quantum state of qubit 100.

Qubit 120 can be grounded to ground 131 through grounding switch 130. The current source 140 is coupled in series with qubit 100 and ground 131, and voltmeter 150 is coupled in parallel with qubit 100. When switch 130 is closed, grounding island 120, the wavefunction of the supercurrent collapses into one of the ground states $\pm\Phi_0$, which has a definite magnetic moment. With island 120 grounded and the quantum state of qubit 100 fixed, a current is applied through qubit 100 by current source 140. Current travels through bulk superconductor 110 and through island 120 to ground 131. With a current being driven through qubit 100, a time dependent change in the flux occurs and a voltage results across qubit 100. Voltmeter 150 measures the voltage and the detected voltage peak is interpreted to determine the state of the qubit. In some embodiments, the bias current generated by current source 140 is between the quantum state associated critical currents of the qubit.

Figure 5:
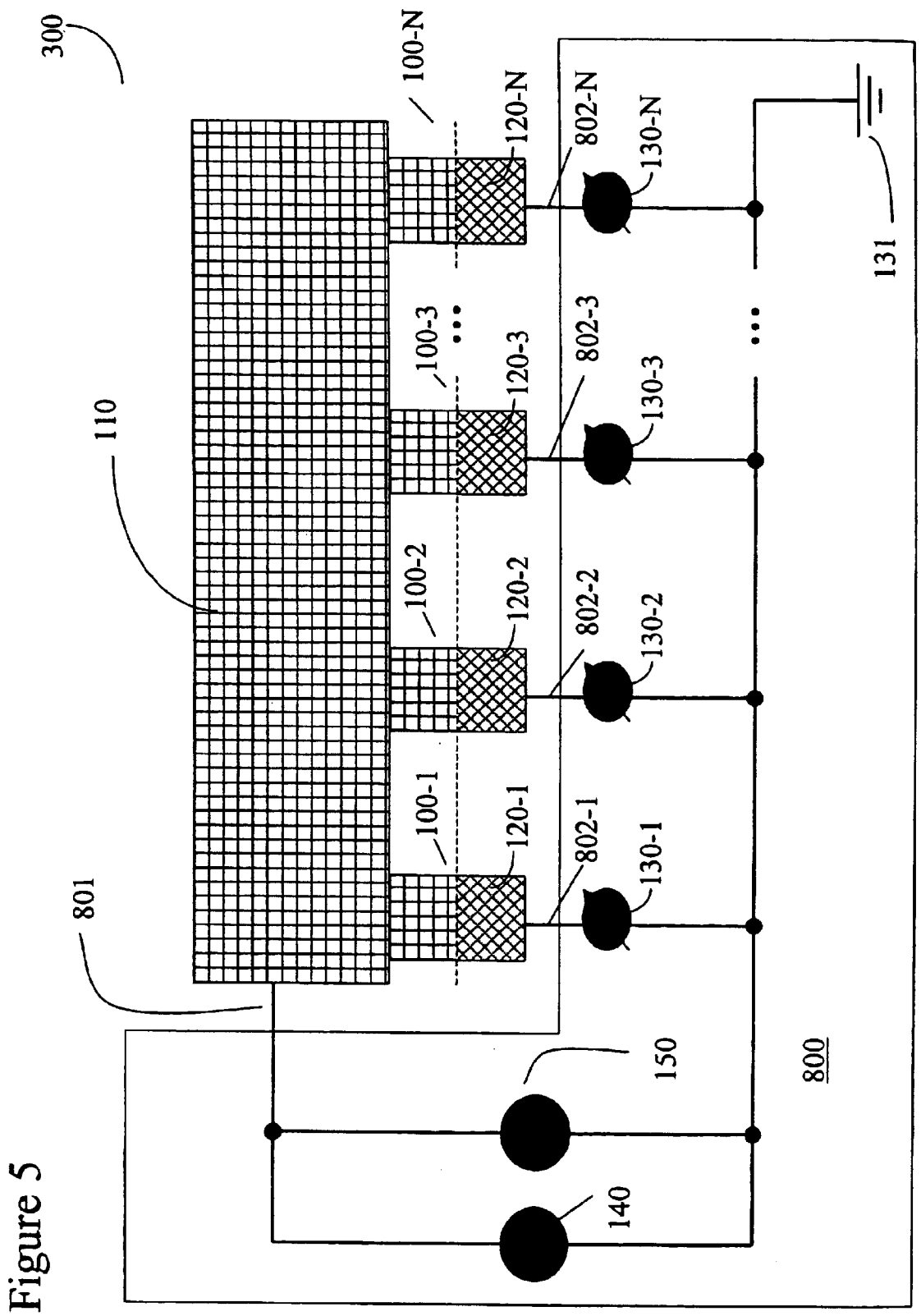
FIG. 5 shows an embodiment of readout circuitry of a control system according to the present invention coupled to an array of qubits.

FIG. 5 shows an example of an array of qubits 300 coupled to an embodiment of control system 800. Each of qubits 100-1 through 100-N in qubit system array of qubits 300 is coupled to a grounding switch 130-1 through 130-N, respectively, by which each of qubits 100-1 through 100-N can be selectively coupled to ground 131 when control system 800 closes switch 130-1 through 130-N, respectively. Furthermore, as in the single qubit case shown in FIG. 4, current source 140 is coupled between bulk superconductor 110 and ground 131. Voltmeter 150 is coupled in parallel with qubits 100-1 through 100-N between bulk superconductor 110 and ground 131.

In a readout method for qubit 100-1, for example, control system 800 grounds island 120-1 by closing switch 130-1. Switches 130-2 through 130-N are left open. Control system 800 can then apply, through current source 140, a bias current through qubit 100-1 and the potential drop across qubit 100-1 can be measured by voltmeter 150. The quantum state of qubit 100-1 is determined by the characteristic voltage measured by voltmeter 150. The readout method can then be repeated, in turn, for all of qubits 100-1 through 100-N.

In some embodiments of the invention, control system 800 and all coupling leads (i.e., leads 801 and 802-1 through 802-N) are fabricated from a high-$T_c$ superconducting material such as $YBa_2Cu_3O_{7-x}$, where x has values between about 0 and about 0.6. Other superconducting materials, such as $Bi_2Sr_2Ca_{n-1}Cu_nO_{2n+4}$, $Tl_2Ba_2CuO_{6+x}$, and $HgBa_2CuO_4$, are examples of d-wave superconductors with a pairing symmetry having a non-zero angular moment, which can also be utilized to fabricate control system 800. In some embodiments of the invention, low temperature superconductor $Sr_2RuO_4$ or heavy fermion material $CeIrIn_5$, for example, which are p-wave superconductors that also have non-zero angular momentum, can be utilized to fabricate control system 800. In order to reduce decoherence due to thermal effects and optimize quantum behavior, in some embodiments qubit system 300 operates at a temperature of around 1K.

In some embodiments of the invention, control system 800 also initializes the quantum states of qubits 100-1 through 100-N in qubit system 300. A method for initializing the state of a qubit 100 (an arbitrary one of qubits 100-1 through 100-N) includes driving a current across the qubit in a specific direction and ramping the current down to zero. The bistability of the ground state in qubit 100 occurs when the bias current through qubit 100 is reduced to zero, where the classical quantum states of qubit 100 correspond to $\pm\Phi_0$. Thus, by driving a current across qubit 100 in a particular direction, a first state can be selected, and by driving a current across qubit 100 in the reverse direction a second state can be selected. When the current is ramped down to zero from the positive direction, the flux state of qubit 100 will relax into the $+\Phi_0$ ground state. Whereas, if the current is ramped to zero from the negative direction, the flux state of qubit 100 will relax into the $-\Phi_0$ ground state. Since the states $+\Phi_0$ and $-\Phi_0$ correspond to the bistable ground states of qubit 100, the action of placing qubit 100 into one or the other of the states is equivalent to initializing the state of qubit 100.

In some embodiments, control system 800 initializes qubit 100 by maintaining a small magnitude current directionally across qubit 100 for a sufficient duration of time. The current from current source 140 effectively biases the potential energy in qubit 100, removing the degeneracy in the classical quantum states. Given a sufficient period of time, the quantum state of qubit 100 will transition into the more energetically favorable state, which is determined by the direction of the applied bias current from current source 140.

Figure 6:
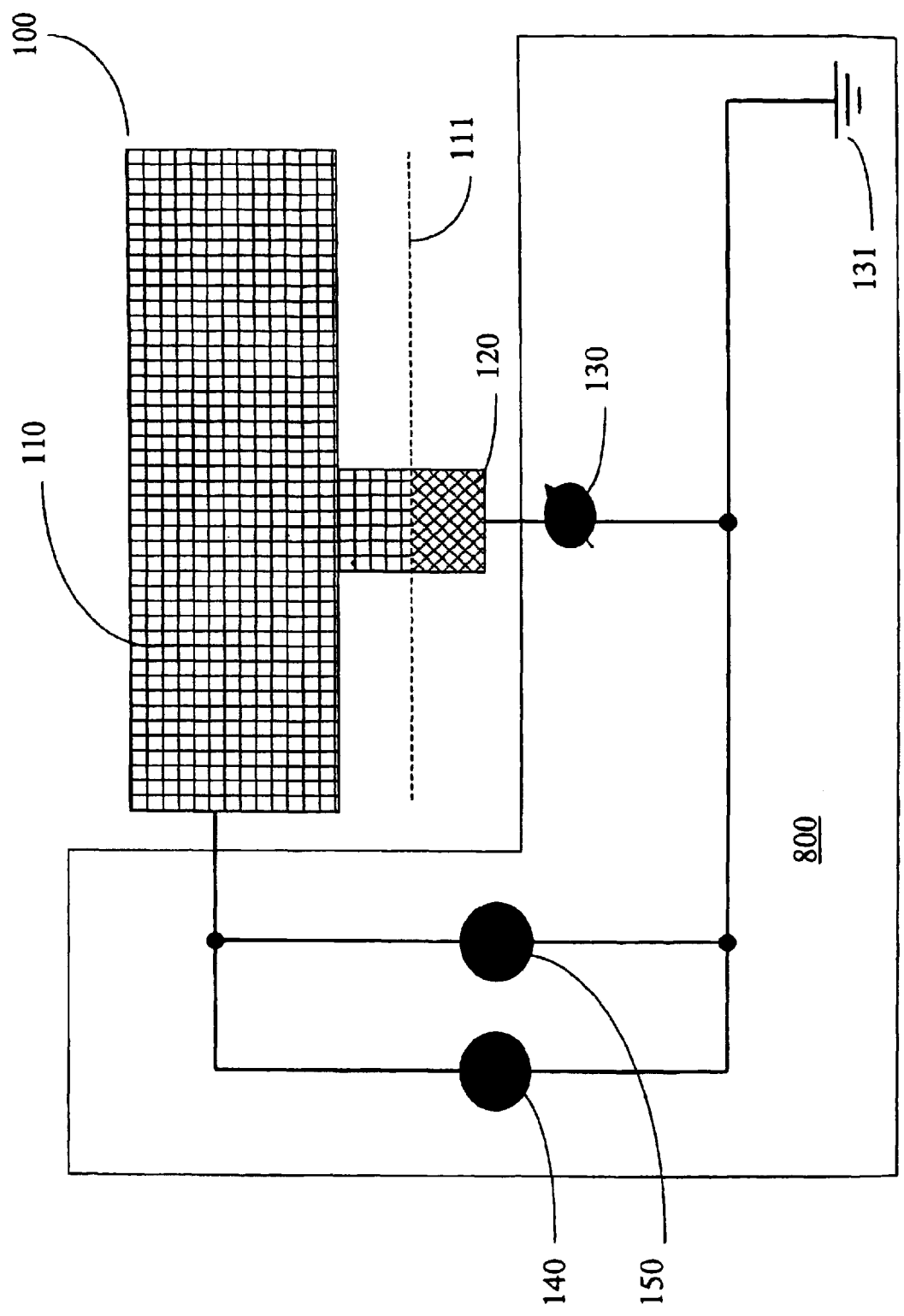
FIG. 6 shows an embodiment of a readout and initialization circuitry of a control system according to the present invention coupled to a qubit.

FIG. 6 shows an embodiment of control system 800 coupled to qubit 100 that can initialize a quantum state of qubit 100. Control system 800 of FIG. 6 includes a bi-directional current source 140 and a grounding switch 130, which can couple island 120 to ground 131. Voltmeter 140 in FIG. 6 can be included to facilitate readout procedures of qubit 100.

An initialization method, then, includes closing switch 130 to ground qubit 100 applying current from current source 140 to qubit 100 at some magnitude $I_b$, and then ramping the current from source 140 from magnitude $I_b$ back to zero. In some embodiments, control system 800 applies a positive current $I_b$ to initialize a first state, and applies a negative current $I_b$ to initialize a second state.

In some embodiments, an initialization procedure includes closing switch 130, which grounds island 120 of qubit 100, and applying a bias current through qubit 100 from current source 140 for a duration of time long enough for the quantum states of qubit 100 to transition, for example by tunneling, into the selected initial state. In some embodiments, the duration of time is dependent on the tunneling rate of the qubit system, and in some embodiments is on the order of the tunneling amplitude of qubit 100 so that the quantum system of qubit 100 relaxes into the selected state.

Figure 7:
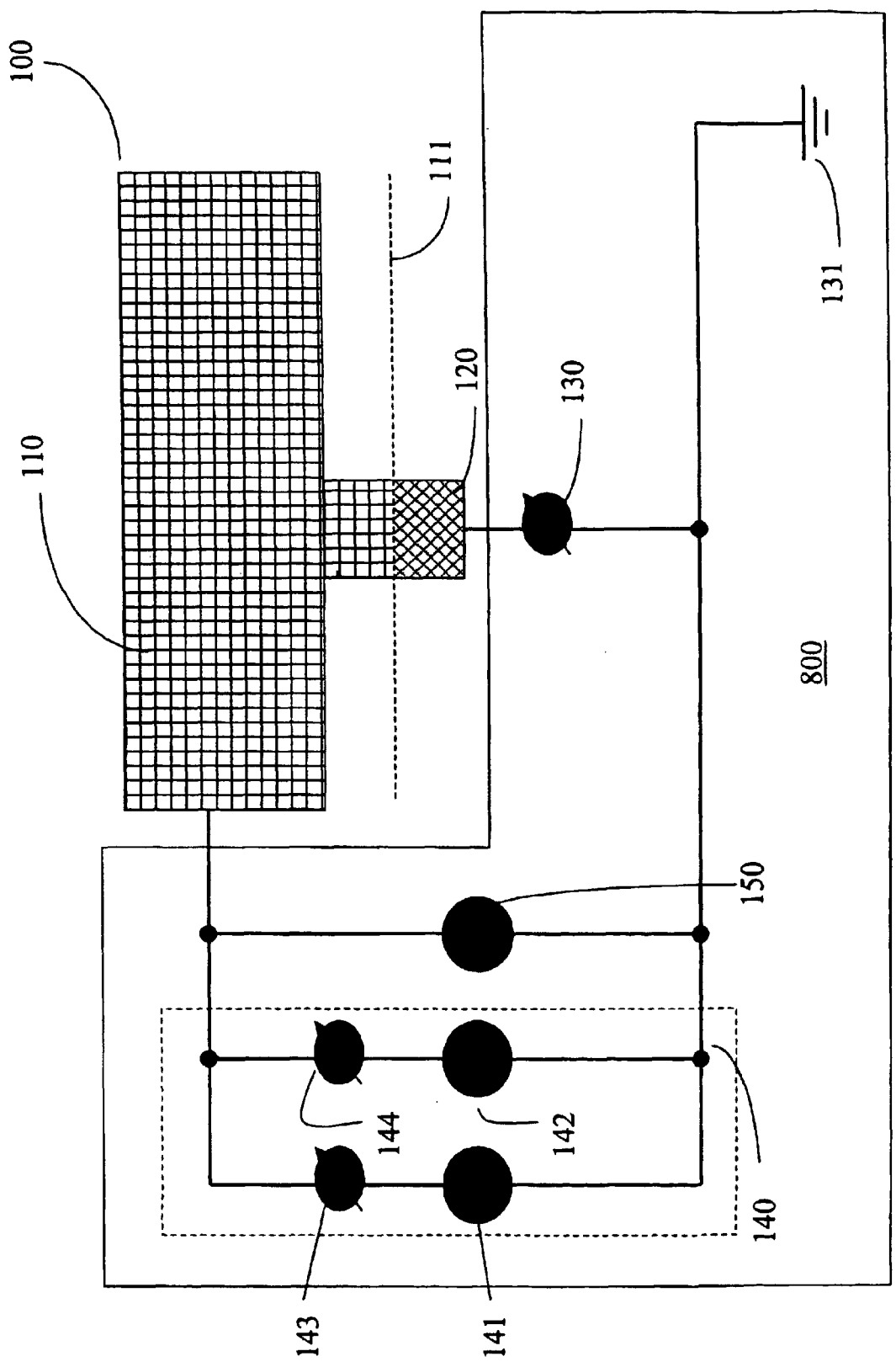
FIG. 7 shows an embodiment of a readout and initialization circuitry of a control system according to the present invention coupled to a qubit.

FIG. 7 shows an embodiment of a current source 140 which is bi-directional. Current source 140, as shown in FIG. 7, includes a first current source 141 and a second current source 142. Current source 141 is coupled in series with a switch 143 and current source 142 is coupled in series with a switch 144. The combination of current source 141 and switch 143 is coupled in parallel with current source 142 and switch 144, which is coupled between superconducting substrate 110 and ground 131. Control system 800 can, then, select current source 141, which provides current in a first direction, by closing switch 143 and opening switch 144. Alternatively, control system 800 can select current source 142, which provides current in a second direction opposite the first direction, by closing switch 144 and opening switch 143. In some embodiments, each of switch 141 and 143 can be a SET.

Figure 8:
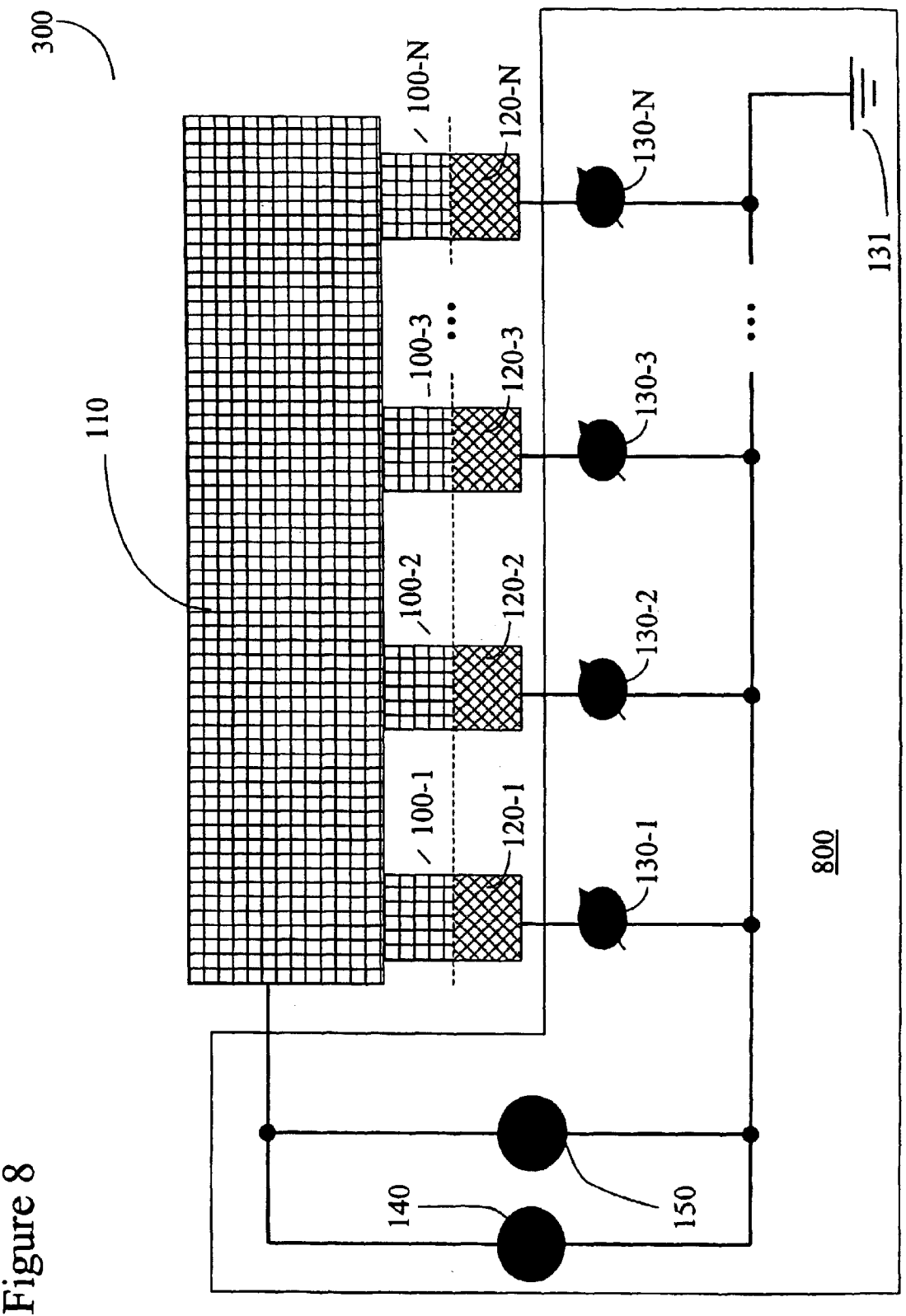
FIG. 8 shows an array of qubits coupled to an embodiment of a control circuit according to the present invention capable of reading out and initializing the qubits.

FIG. 8 shows an embodiment of control system 800 as described with FIG. 7 above coupled to a qubit system 300. Qubit system 300 includes qubits 100-1 through 100-N. In some embodiments, control system 800 can initialize each of qubits 100-1 through 100-N in turn, where one of qubits 100-1 through 100-N to be initialized is selected by closing the respective one of switches 130-1 through 130-N, grounding the selected one of qubits 100-1 through 100-N and applying current across the one of qubits 100-1 through 100-N being initialized.

Figure 9:
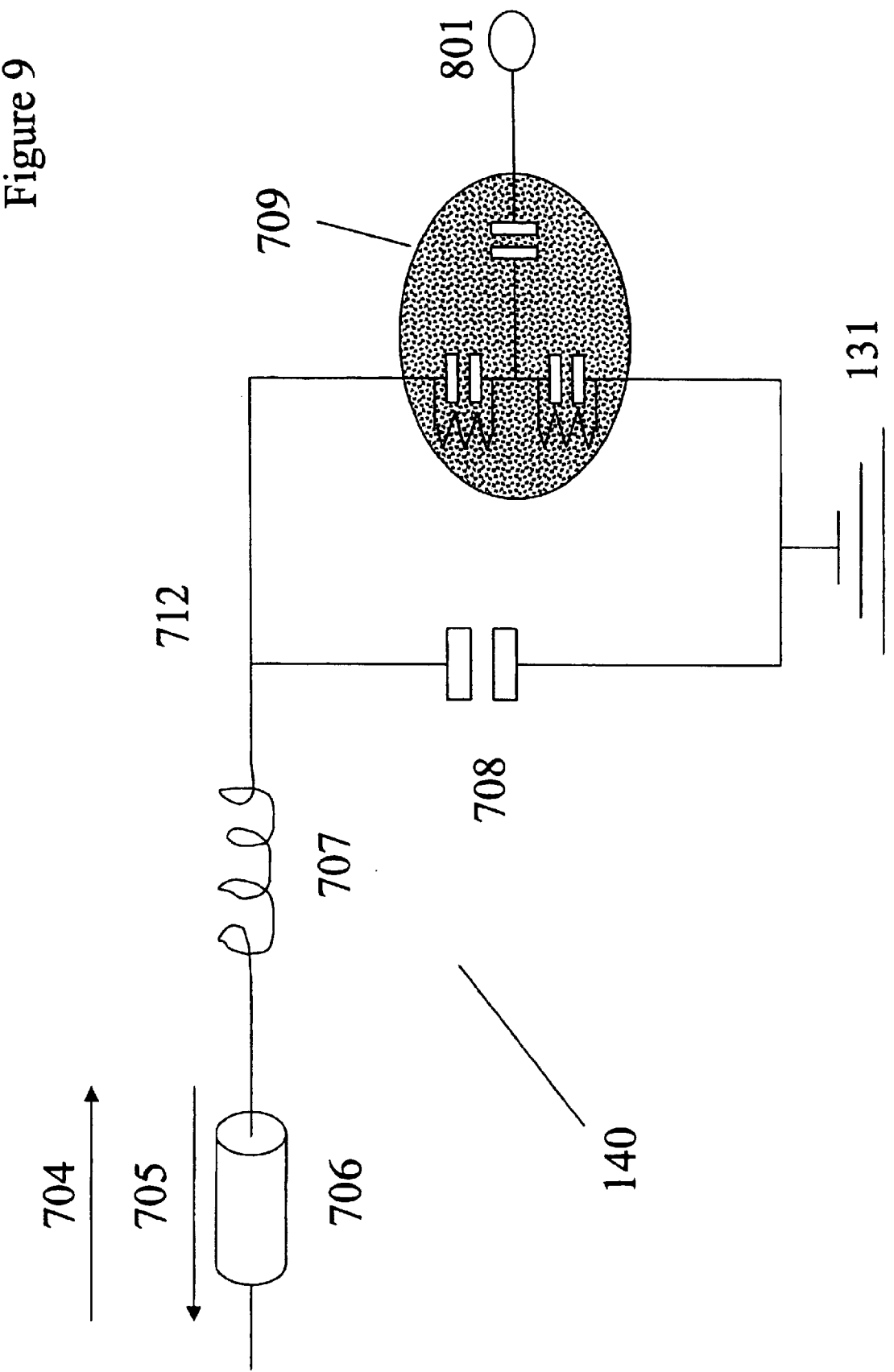
FIG. 9 shows an embodiment of a radio frequency single electron transistor (RF-SET).

FIG. 9 demonstrates an embodiment of voltmeter 140 which can be utilized with control system 800. Voltmeter 140 can be a radio-frequency single electron transistor electrometer such as that described in, for example, A. N. Korotkov and M. A. Paalanen, "Charge Sensitivity of Radio-Frequency Single Electron Transistor," Appl. Phys. Lett. 74, 26 (1999), which is herein incorporated by reference in its entirety. The operation and behaviour of SETs is well known, and is described in detail in P Joyez et al., "Observation of Parity-Induced Suppression of Josephson Tunneling in the Superconducting Single Electron Transistor," Physical Review Letters, Vol. 72, No. 15, 11 Apr. 1994, which is herein incorporated by reference in its entirety.

The RF-SET voltmeter 140 is comprised of a SET 709, a tank circuit 712, and a port for applying and detecting a signal 706. The single-electron transistor (SET) 709 can be made of any superconducting material, for example niobium, aluminum, lead, tin, and any high-temperature superconducting cuprate. A description of the operation and manufacture of single electron transistors is described in P. Joyez et al., "Observation of Parity-Induced Suppression of Josephson Tunneling in the Superconducting Single Electron Transistor", Physical Review Letters, Vol. 72, No. 15, 11 Apr. 1994, and R. J. Schoelkopf, P. Wahlgren, A. A. Kozhevnikov, P. Delsing, and D. E. Prober, "The Radio-Frequency Single-Electron Transistor (RF-SET): A Fast and Ultrasensitive Electrometer, " Science, Vol. 280, 1238–42 (May 22, 1998), which are herein incorporated by reference in their entirety. SET 709 is placed in a high quality factor tank circuit 712 tuned to resonance. Tank circuit 712 includes inductor 707 and capacitor 708. Capacitor 708 is coupled in parallel with SET 709. A third terminal of SET 709 is coupled to electrode 801, which in control system 800 is coupled to superconducting substrate 110. A radio-frequency or microwave signal 704 is introduced into circuit 712. The reflected signal 705 is a function of the conductance of SET 709. Analysis of reflected signal 705 using established techniques allows measurement of the voltage difference between electrode 710 and ground 131.

In operation, when a current is driven across qubit 100 and a rf-SET voltmeter 140 is coupled in parallel with qubit 100, the resonance of tank circuit 712 will be disturbed and changes in the returning microwave pulses 705 will allow detection of the quantum state of qubit 100.

In some embodiments of the invention, readout of the quantum state of qubit 100 may be done via the use of a single electron transistor (SET) according to known procedures, described, for example, by Makhlin Y, Schoen G, and Shnirman A, "Quantum state engineering with Josephson junction devices," arXiv, cond-mat/0011269, 15 Nov. 2000, which is hereby included by reference in its entirety. An embodiment of a SET is shown as SET 709 of FIG. 9. SET 709 may be coupled to three devices (e.g., terminals 131, 801 and 712). An electron or Cooper pair can tunnel onto SET 709 when SET 709 is uncharged. However, SET 709 is small enough that once an electron or Cooper pair tunnels onto SET 709, the charging of SET 709 electrically repels and prevents further tunneling onto SET 709. A terminal 801 associated with SET 709 can change the voltage of SET 709 and de-tune tank circuit 712, changing the characteristics of the reflected wave 705.

Figure 10:
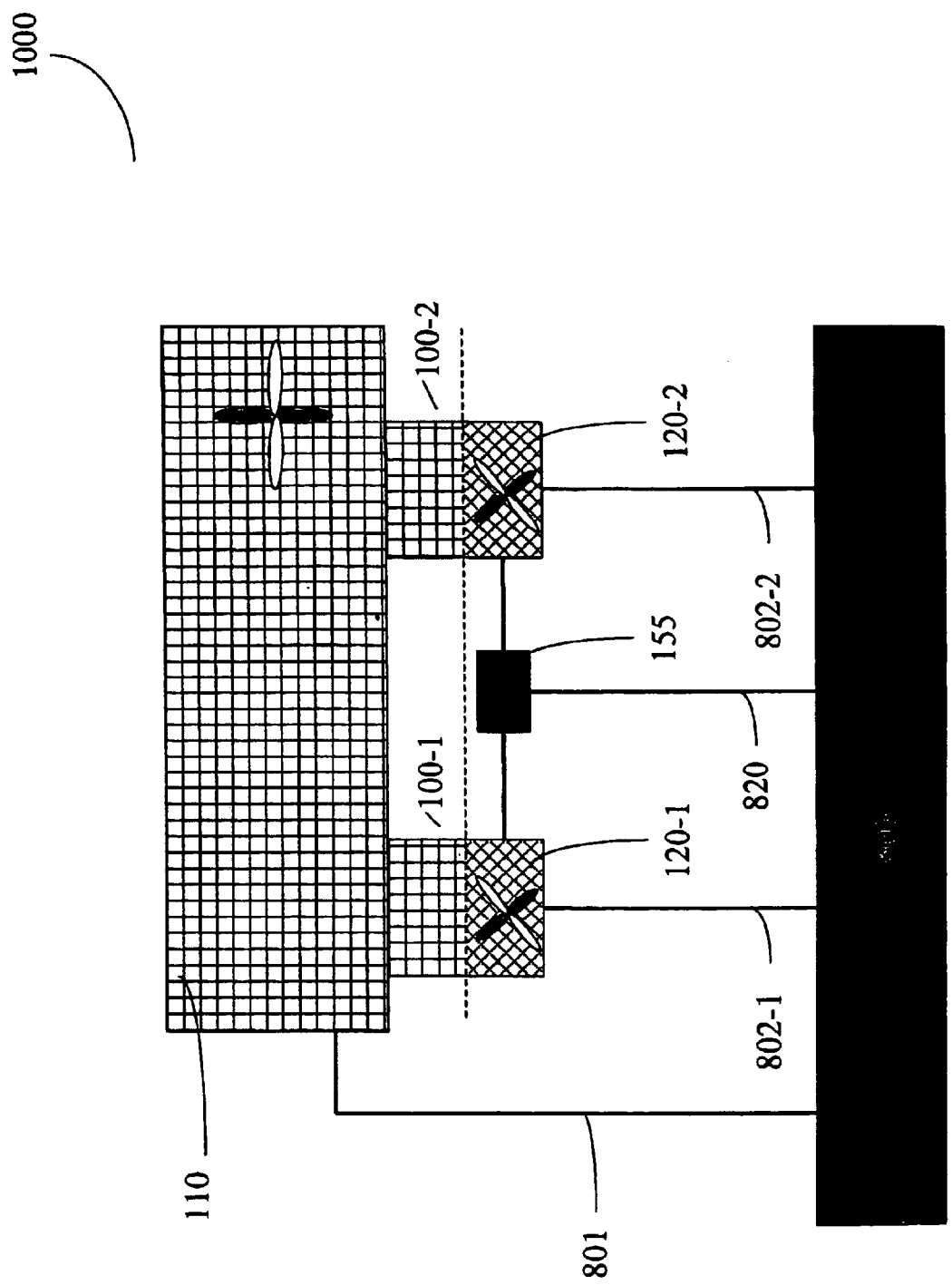
FIG. 10 shows an embodiment of a control system according to the present invention capable of entangling qubits.

As shown in FIG. 10, in some embodiments control system 800 can entangle quantum states between two qubits, qubits 100-1 and 100-2 of qubit pair 1000. Control system 800 of FIG. 10 further controls an entanglement switch 155 through a control line 820. Entanglement of qubits occurs during free evolution of the quantum states of qubits 100-1 and 100-2. When qubits 100-1 and 100-2 are completely decoupled from their environments, an entanglement operation allows the wavefunctions of the quantum states of each of qubits 100-1 and 100-2 to overlap, thus mixing information about the state of each of qubits 100-1 and 100-2. In the solid state, it is possible to entangle qubits 100-1 and 100-2 by physically coupling qubits 100-1 and 100-2 together. By allowing the persistent currents in qubits 100-1 and 100-2 to mix, the states of qubits 100-1 and 100-2 become entangled.

As shown in FIG. 10, control system 800 can entangle the quantum states of qubits 100-1 and 100-2 by directly coupling islands 120-1 and 120-2 of qubits 100-1 and 100-2, respectively, together through an entanglement switch 155 and controlling the state of switch 155. When switch 155 is closed, a supercurrent can pass between island 120-1 and 120-2. Control system 800 is capable of switching switch 155, controlling the coupling between qubits 100-1 and 100-2, on and off as required for implementation of a quantum algorithm.

In some embodiments of the invention, entanglement switch 155 allows the coherent passing of cooper pairs when closed, while effectively severing the link between qubits 100-1 and 100-2 when open. In some embodiments, the switching rate of entanglement switch 155 is on the order of the largest possible tunneling amplitude in qubits 100-1 and 100-2, such that entanglement switch 155 is fast when compared to the time scales of quantum state transitions in qubits 100-1 and 100-2.

In some embodiments, control system 800 couples qubits 100-1 and 100-2 for a unit duration of time, wherein the unit duration is dependent upon the embodiment of qubits 100-1 and 100-2. In some embodiments, the unit duration can be at least on the order of the tunneling amplitude of qubit system 1000. Where a longer coupling duration is required by a computing algorithm, multiple unit duration entanglements can be combined.

Figure 11:
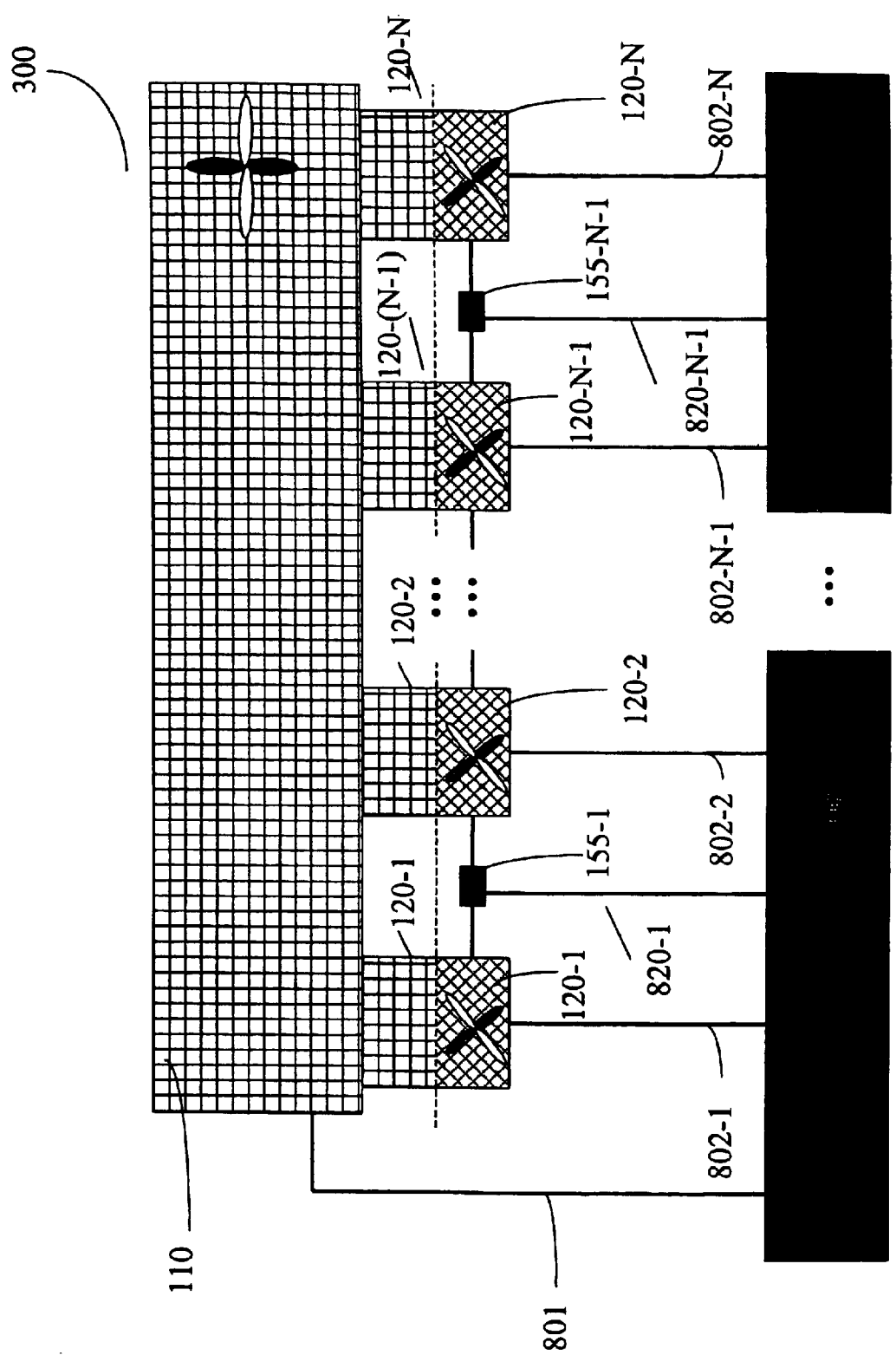
FIG. 11 shows an embodiment of a control system according to the present invention capable of entangling qubits coupled to control an array of qubits.

FIG. 11 shows an embodiment of the invention with a qubit array 300 coupled to a control system 800 where control system 800 can entangle the quantum states of adjacent ones of qubits 100-1 through 100-N. Adjacent pairs of qubits 100-1 through 100-N are coupled through switches 155-1 through 155-(N-1). Qubits 100-1 and 100-2 are coupled through switch 155-1, for example, while qubits 100-(N-1) and 100-N are coupled through switch 155-(N-1). Control system 800 is coupled to each of switches 155-1 through 155-(N-1) so that control system 800 can entangle quantum states between adjacent ones of qubits 100-1 through 100-N in response to algorithm program instructions.

Figure 12:
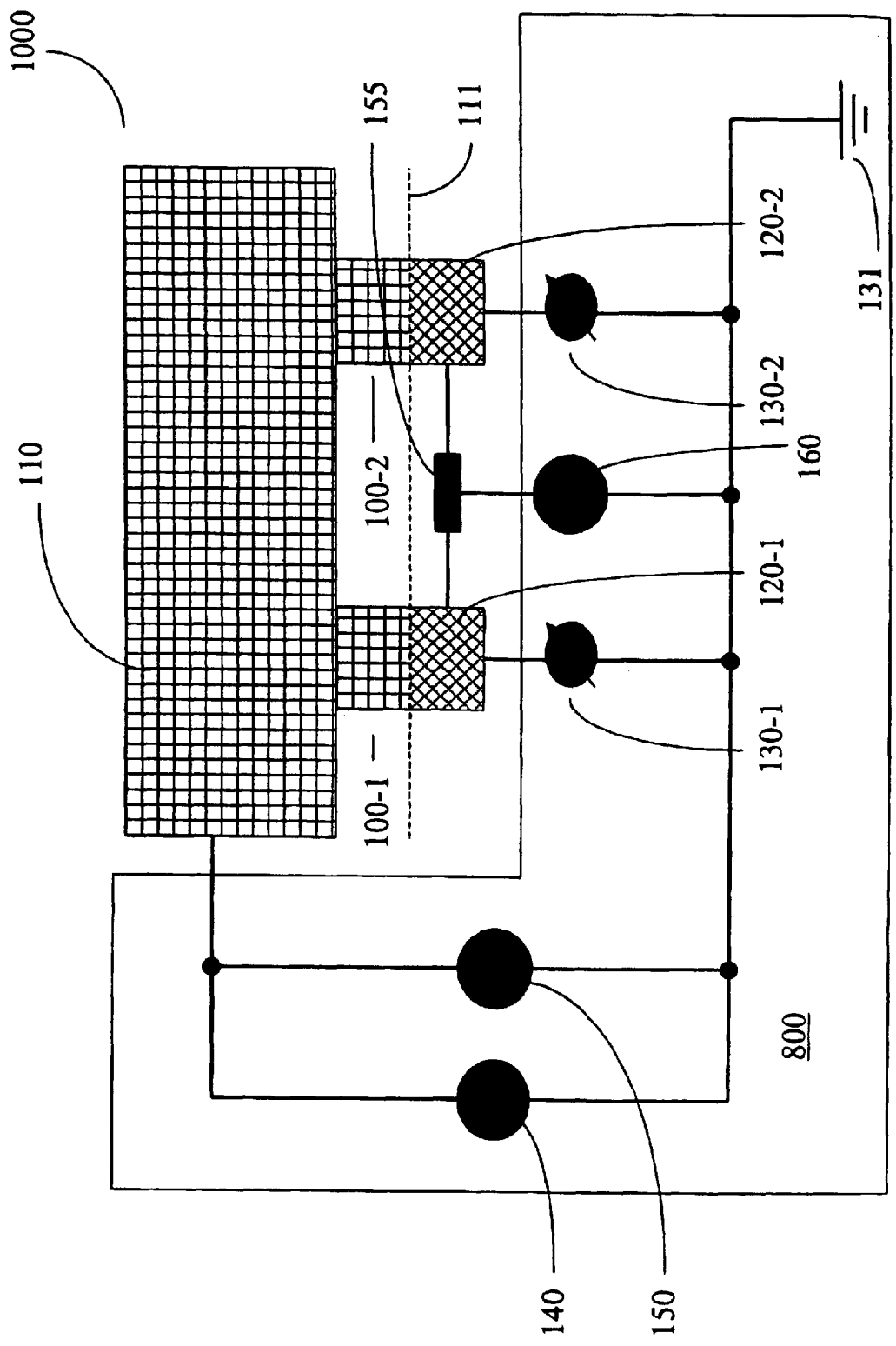
FIG. 12 shows an embodiment of a control system according to the present invention that is coupled to qubits.

FIG. 12 shows an embodiment of the invention where control system 800 can initialize qubits 100-1 and 100-2 of qubit pair 1000, can readout qubits 100-1 and 100-2, and can entangle qubits 100-1 and 100-2 as discussed above. Control system 800 includes a bi-directional current source 140 coupled across qubits 100-1 and 100-2, a voltmeter 150 coupled across qubits 100-1 and 100-2, grounding switches 130-1 and 130-2 coupled between islands 120-1 and 120-2, respectively, and ground 131, and entanglement voltage source 160 coupled to entanglement switch 155 to control the entanglement between qubits 100-1 and 100-2.

In some embodiments of the invention, entanglement switch 155 is a SET or parity key, and voltage source 160 turns entanglement switch 155 to an open state or a closed state. Control system 800 can entangle the quantum states of qubits 100-1 and 100-2 by applying a voltage $V_g$ with voltage source 160 to entanglement switch 155. Entanglement switch 155 then closes and allows cooper pairs to flow between qubits 100-1 and 100-2, thus entangling the quantum states of qubits 100-1 and 100-2. During the entanglement operation, grounding switches 130 are open so that the qubits 100-1 and 100-2 are isolated from the environment and are freely evolving quantum mechanically.

Further, control system 800 in FIG. 12 can read out the quantum state of qubits 100-1 and 100-2 by opening entanglement switch 155, grounding one of islands 120-1 and 120-2 through grounding switches 130-1 and 130-2, and applying a current from current source 140 while monitoring the voltage across the one of qubits 100-1 and 100-2 being read. Additionally, control system 800 in FIG. 12 can initialize the states of qubits 100-1 and 100-2 by opening entanglement switch 155, grounding one of islands 120-1 or 120-2, and applying a bias current from current source 140 as described above so that the quantum state of the one of qubits 100-1 and 100-2 being initialized transitions to the desired state.

Figure 13:
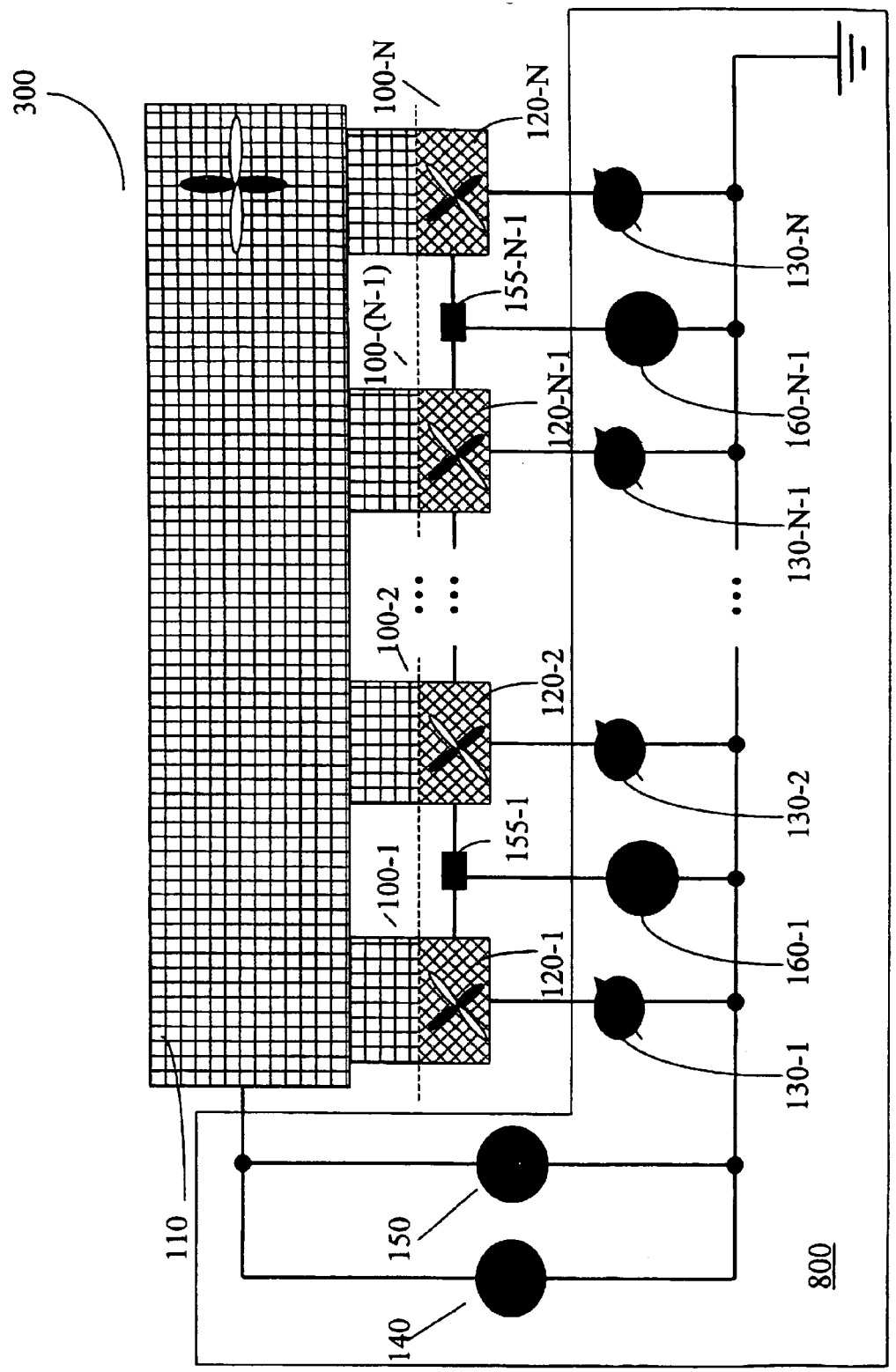
FIG. 13 shows an embodiment of a control system according to the present invention that is coupled to an array of qubits.

FIG. 13 shows a qubit array (register) 300 coupled to control system 800. Control system 800 can perform readout operations on each of qubits 100-1 through 100-N, can initialize each of qubits 100-1 through 100-N, and can entangle adjacent pairs of qubits 100-1 through 100-N. Adjacent ones of qubits 100-1 through 100-N are coupled through entanglement switches 155-1 through 155-(N-1), where the state of each entanglement switch 155-1 through 155-(N-1) can be modulated by voltage sources 160-1 through 160-(N-1), respectively. Any number of pairs of adjacent qubits 100-1 through 100-N can be entangled under the direction of control system 800 at any given time. Control system 800 entangles adjacent pairs of qubits 100-1 through 100-N in response to algorithm instructions which can be communicated to control system 800.

Further, control system 800 of FIG. 13 includes a current source 140, a voltmeter 150, grounding switches 130-1 through 130-N, and a ground 131 that, as discussed above, allow control system 800 to read out the quantum states of qubits 100-1 through 100-N and initialize the quantum states of qubits 100-1 through 100-N. In this manner, control system 800 provides all of the operations for performing quantum computation algorithms.

Figure 14:
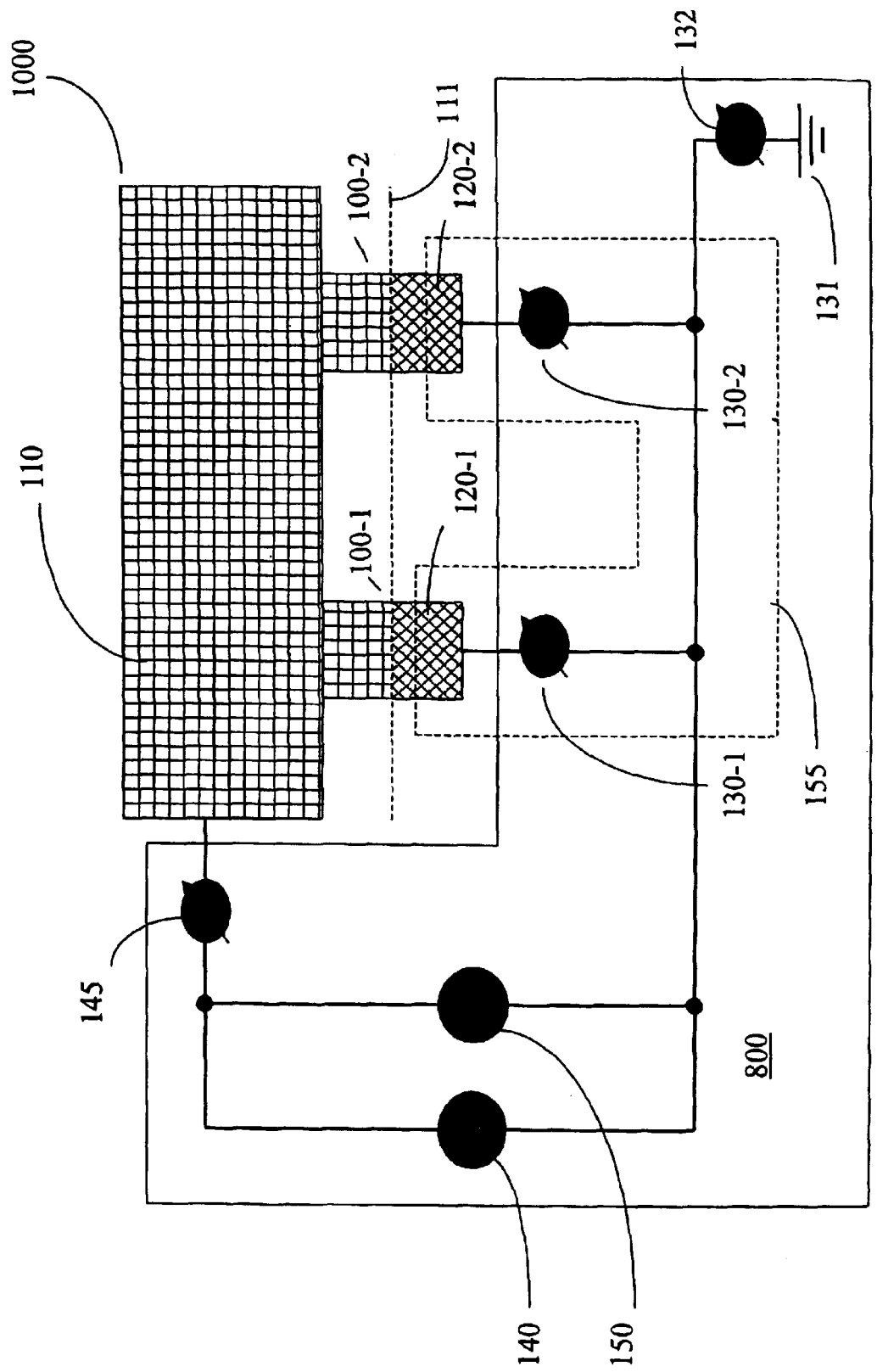
FIG. 14 shows an embodiment of a control system according to the present invention coupled to qubits.

FIG. 14 shows another embodiment of a pair of qubits 1000 coupled to a control system 800 capable of reading out the quantum states of qubits 100-1 and 100-2, initiating quantum states in qubits 100-1 and 100-2, and entangling quantum states in qubits 100-1 and 100-2. Control system 800 includes switch 132 coupled between ground 131 and switches 130-1 and 130-2. Control system 800, then, can entangle the quantum states of qubits 100-1 and 100-2 by closing both switches 130-1 and 130-2 and opening switch 132 so that switches 130-1 and 130-2 do not ground islands 120-1 and 120-2, respectively. In some embodiments, a switch 145 can also be included between parallel coupled current source 140 and voltmeter 150 and superconducting substrate 110. Qubits 100-1 and 100-2, then, can be further decoupled from influences outside of qubits 100-1 and 100-2.

Additionally, one of qubits 100-1 and 100-2 can be read out by closing switch 132 and switch 145, closing the one of switches 130-1 or 130-2 that corresponds to the qubit being read, applying a current from current source 140, and measuring the voltage with voltmeter 150. One of qubits 100-1 and 100-2 can be initiated by closing switch 132 and switch 145, closing one of switches 130-1 or 130-2 depending on which of qubits 100-1 or 100-2 is being initiated, and applying a current across the one of qubits 100-1 and 100-2 from source 140.

Figure 15:
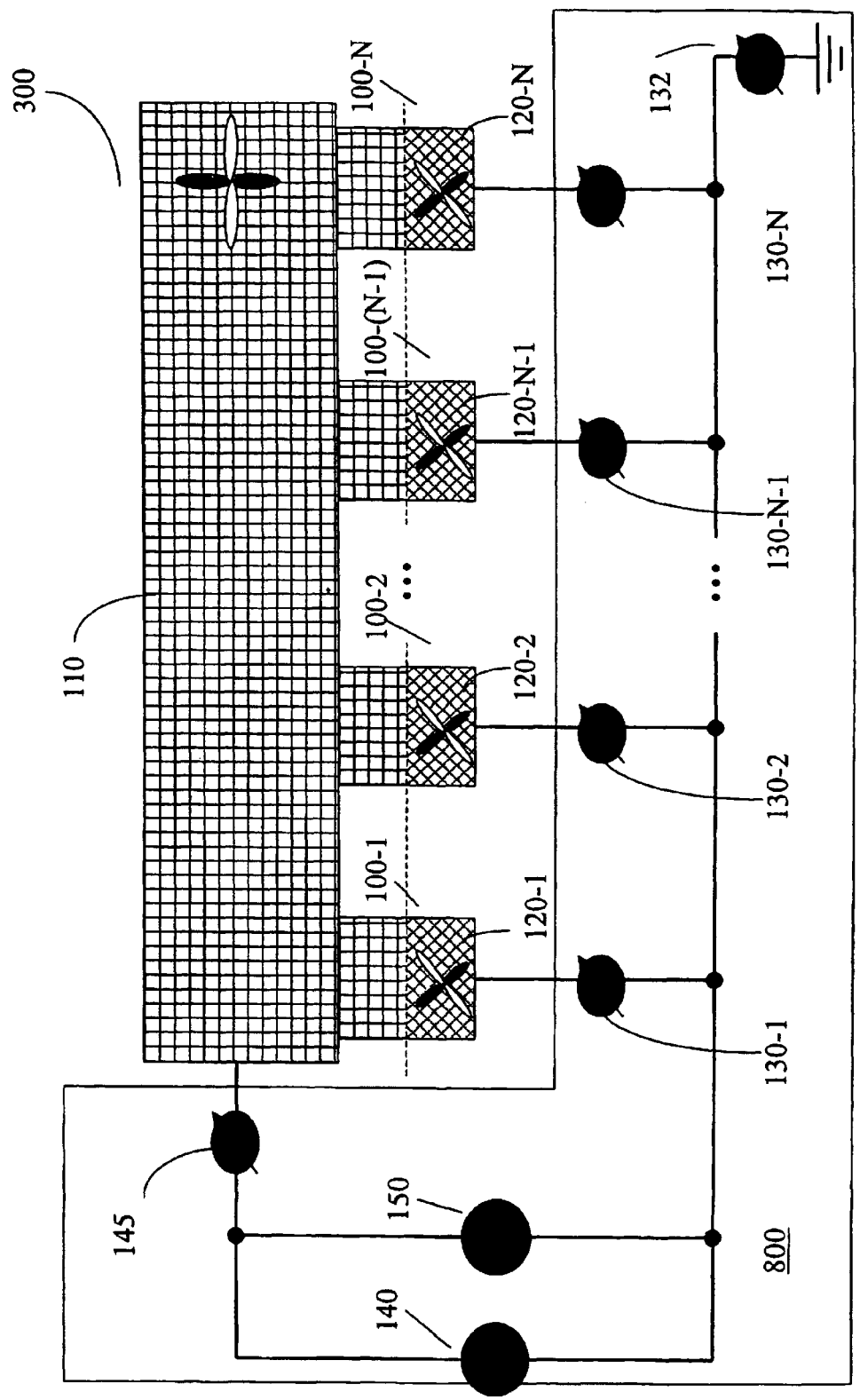
FIG. 15 shows an embodiment of a control system according to the present invention coupled to an array of qubits.

FIG. 15 shows another embodiment of a qubit array 300 coupled to control system 800, where control system 800 can perform read out, initialization, and entanglement operations on qubits 100-1 through 100-N. Each of qubits 100-1 through 100-N is coupled through switches 130-1 through 130-N, respectively, to ground through switch 132. Control system 800 can ground each of islands 120-1 through 120-N by closing switches 130-1 through 130-N, respectively, and closing switch 132. Control system 800 can entangle the states of adjacent ones of qubits 100-1 through 100-N by closing the corresponding ones of switches 130-1 through 130-N and opening switch 132. Additionally, control system 800 as shown in FIG. 15 is not limited to entangling quantum states between adjacent ones of qubits 100-1 through 100-N. Qubits 120-2 and 120-(N-1), for example, can be entangled by closing switches 130-2 and 130-(N-1) while opening switch 132. In the embodiment of control system 800 shown in FIG. 15, any number of qubits can be entangled by closing the respective ones of switches 130-1 through 130-N and opening switch 132.

Figure 16:
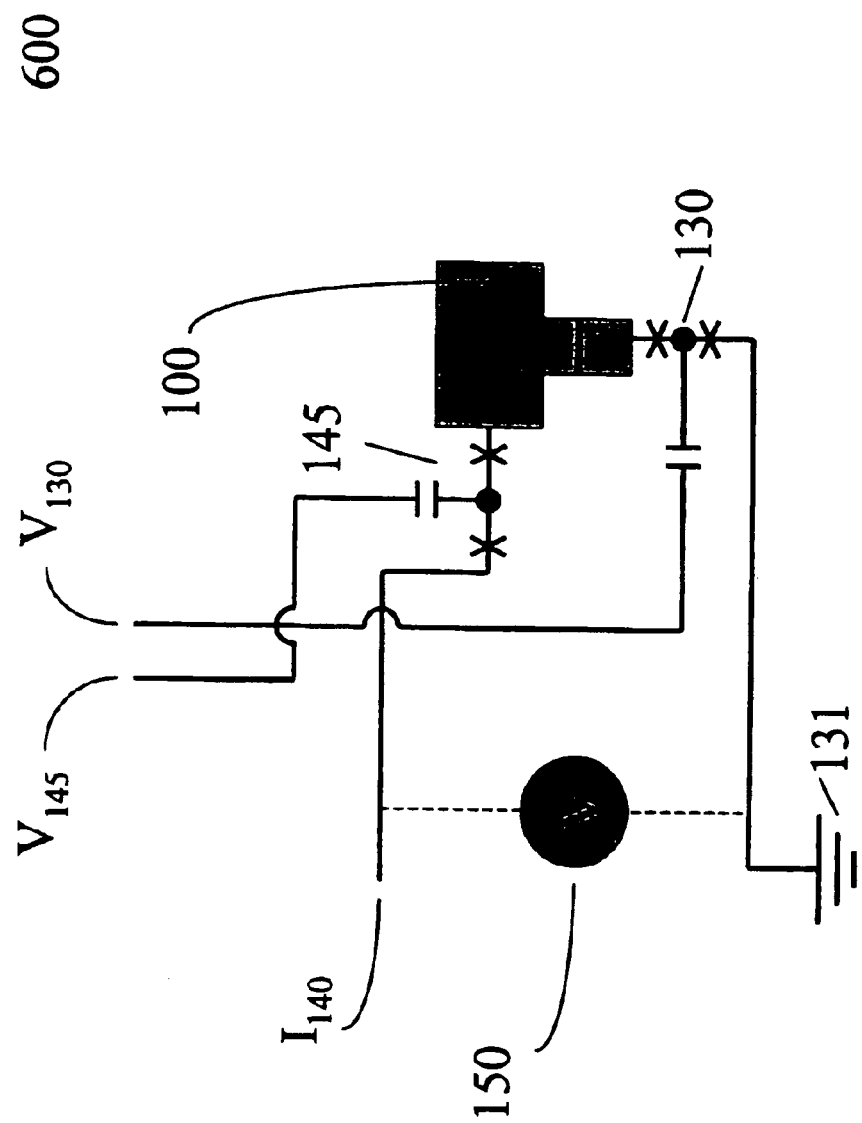
FIG. 16 shows an embodiment of a control system according to the present invention coupled to a single phase qubit.

FIG. 16 shows a single qubit system 600 that includes a qubit 100, a qubit switch 145 modulated by a voltage $V_{145}$, a grounding switch 130 modulated by a voltage $V_{130}$, a current line $I_{140}$ coupled to qubit 100 through qubit switch 145, a ground 131 coupled to qubit 100 through grounding switch 130, and a voltmeter 150 coupled to measure the potential drop between the current line $I_{140}$ and ground 131. An embodiment of a method for initializing the state of qubit 100 in system 600, can include applying voltages $V_{145}$ and $V_{130}$ to qubit switch 145 and grounding switch 130, respectively, and applying a current $I_{140}$. The direction of the applied current can determine the selected basis state of qubit 100. An embodiment of a method for reading out the state of qubit 100 can include applying voltages $V_{145}$ and $V_{130}$ to qubit switch 145 and ground switch 130, respectively, thus grounding qubit 100, applying a current to current line $I_{140}$, measuring the potential drop between current line $I_{140}$ and ground 131, and interpreting the state of qubit 100 based on the measured potential drop.

Figure 17:
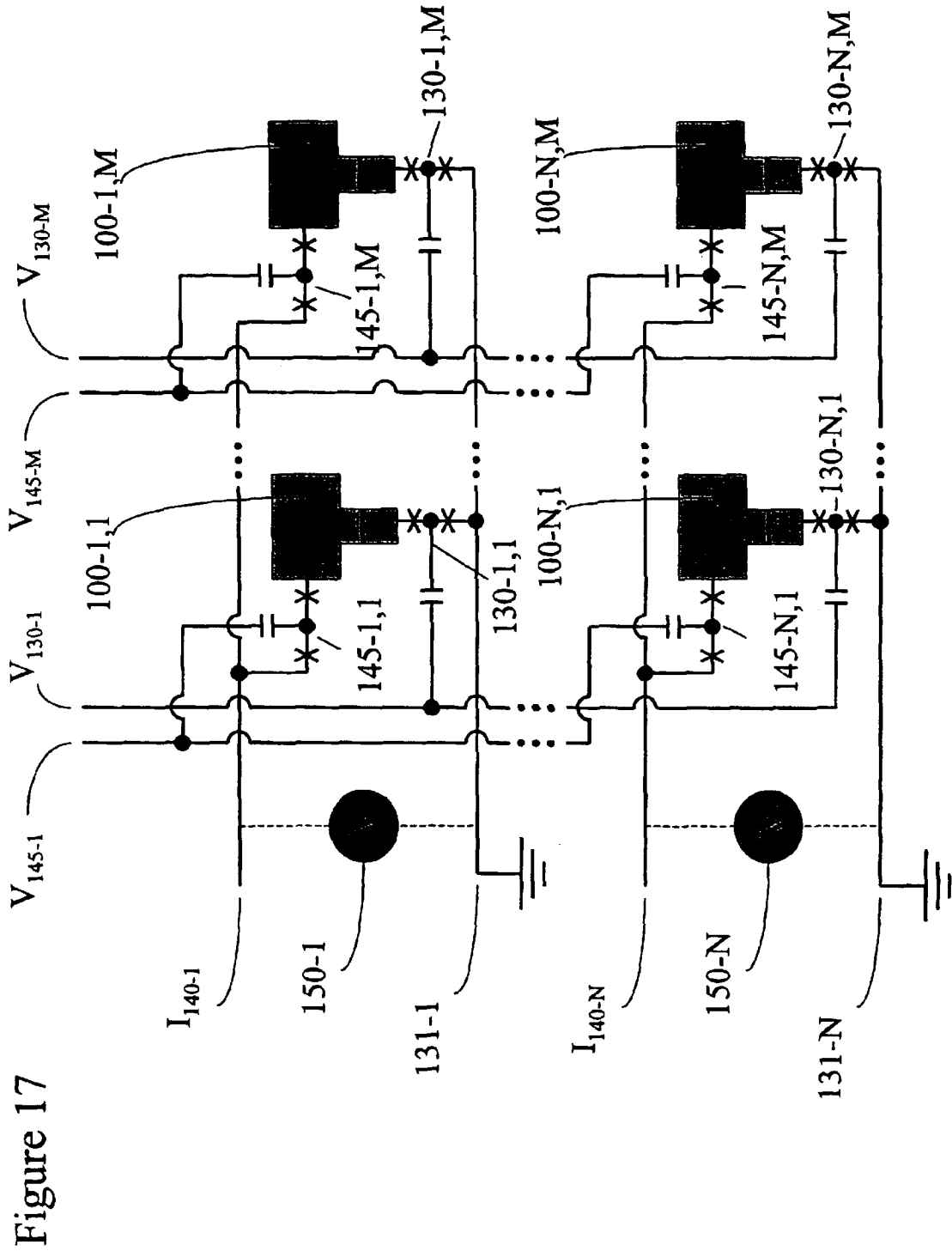
FIG. 17 shows an embodiment of a control system according to the present invention coupled to a 2-dimensional array of phase qubits.

FIG. 17 shows a two-dimensional representation of a grid of qubits that includes qubits 100-1,1, through 100-N,M. Qubits 100-1,1 through qubits 100-N,M are coupled through switches 145-1,1 through 145-N,M, respectively by row, to currents $I_{140-1}$ through $I_{140-N}$. Further, qubits 100-1,1 through qubits 100-N,M are coupled through switches 130-1,1 through 130-N,M, respectively by row, to ground 131-1 through 131-N. Switches 145-1,1 through 145-N,M are coupled, by columns, to control voltages $V_{145-1}$ through $V_{145-M}$. Further, switches 130-1,1 through 130-N,M are coupled, by columns, to control voltages $V_{130-1}$ through $V_{130-M}$. Further, voltmeters 150-1 through 150-N measure the potential drops between $I_{140-1}$ through $I_{140-N}$ and ground 131-1 to 131-N, respectively. With this notation, for example, qubit 100-i,j refers to the ith row and the jth column.

In some embodiments, qubits 100-1,1 through 100-N,M can be initialized by initializing each successive column of qubits simultaneously, and progressing across the columns. For example, first a voltage can be applied to the voltage lines $V_{145-1}$ and $V_{130-1}$, thus closing the respective qubit switches and grounding switches for every qubit in the first column. Secondly, a current can be applied to each of the current lines $I_{140-1}$ through $I_{140-N}$ simultaneously, such that the direction of the current in the respective current line determines the basis state to be initialized. The process can then be repeated for the remaining columns in the grid, thus requiring a total of M steps to initialize the entire qubit system. An embodiment of a method for reading out the state of the grid qubit system, qubits 100-1,1 through 100-N,M, can include grounding the entire system by closing each of switches 100-1,1 through 100-N,M, applying a voltage to one column of qubit switches 145-1,1 through 145-N,M of a column of qubits to be read, applying a current to the respective current line of the first qubit, measuring the potential drop between the respective current line and grounding lines, and interpreting the state of the qubit that is being read. During calculation, qubits 100-1,1 through 100-N,M in the qubit system can be completely isolated from the surroundings by opening all of switches 145-1,1 through 145-N,M and 130-1,1 through 130-N,M.

As described above, an aspect of quantum computing can include entanglement of qubit states. An embodiment of the invention can provide. a method for entangling qubits in a qubit system, wherein the qubit system can have a 2-dimensional grid layout. If the ground line includes a line grounding switch, then the line can be used as a means of entangling the state any two qubits in a row when the ground is disconnected from the line.

Figure 18:
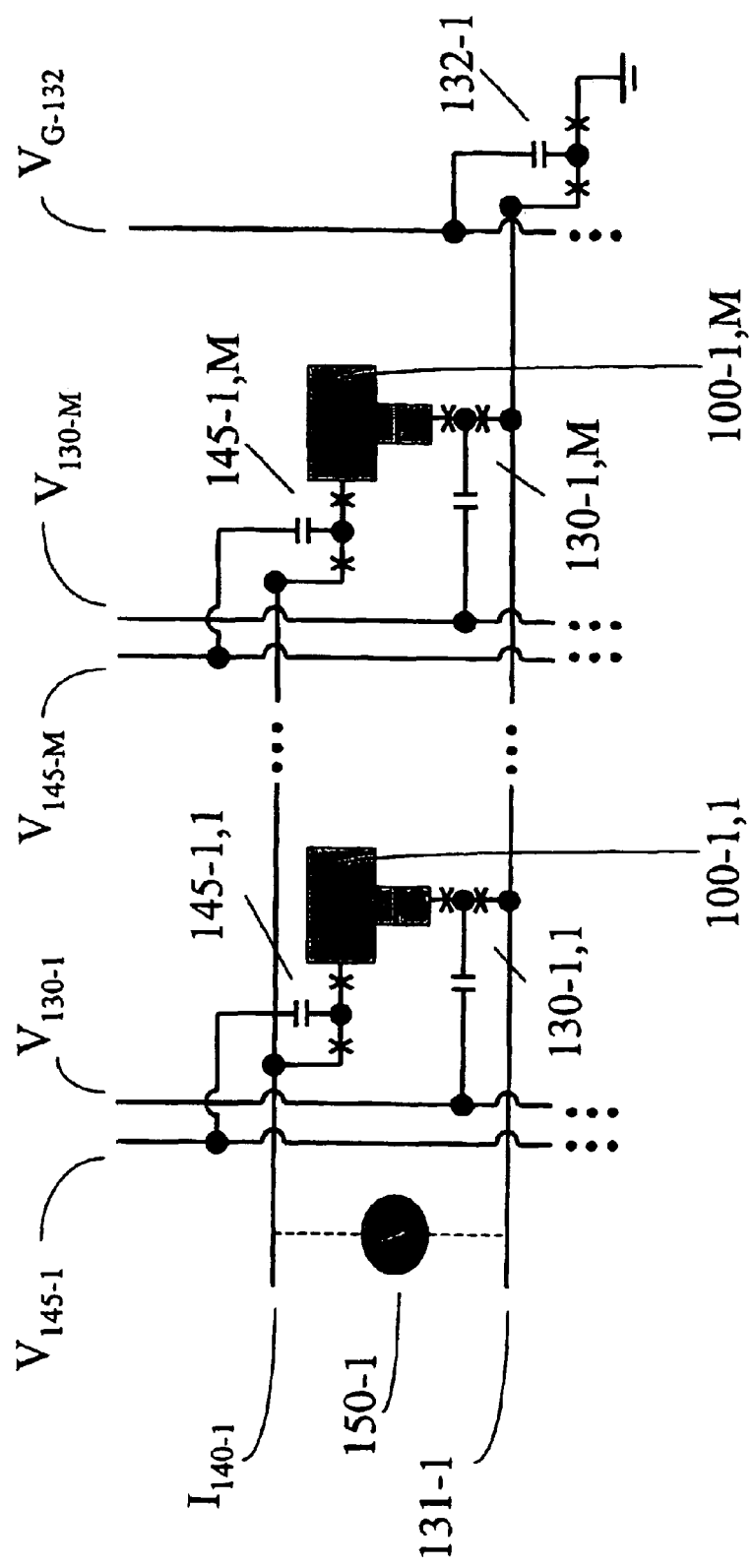
FIG. 18 shows an embodiment of a control system according to the present invention coupled to an array of qubits, wherein the control system can entangle qubits of the array of qubits.

FIG. 18 shows an embodiment of the invention, wherein the grounding line 131-1 includes a line grounding switch 132-1, modulated by the voltage $V_{G-132}$. An embodiment of a method for entangling qubits can include opening line grounding switch 132-1 in the row, such that a qubit connected to the grounding line 131-1 remains isolated from ground. Modulation of grounding switch 132-1 can be controlled by a voltage line $V_{G-132}$. In an embodiment of the invention, the voltage line modulates the line grounding switches for all rows. Another embodiment of the invention, each of the line grounding switches can be modulated independently of the other rows in the system. In such an embodiment, each qubit could be grounded independently of all other qubits in the system, thus allowing the readout and initialization of individual qubits without any disruption to calculation.

Although the invention has been described with reference to particular embodiments, the embodiments specifically described are only examples of the invention's application and should not be taken as limiting. One skilled in the art will recognize variations that are within the spirit and scope of this invention. For example, although the embodiments discussed here included permanent readout superconducting qubits, any phase qubit can be included. Various adaptations and combinations of features of the embodiments disclosed are within the scope of the invention as defined by the following claims.

We claim:

1. A method for reading out the state of a qubit, comprising:
   grounding the qubit to form a closed circuit;
   providing a galvanic current through the grounded qubit;
   measuring a voltage across the grounded qubit; and
   determining a quantum state of the qubit based on the voltage.

2. The method of claim 1, wherein the qubit has a first quantum state corresponding to a first critical current of the qubit and a second quantum state corresponding to a second critical current of the qubit.

3. The method of claim 1, wherein the qubit is a phase qubit.

4. The method of claim 1, wherein the grounding comprises closing a switch that couples the qubit to a ground.

5. The method of claim 1, wherein the providing comprises enabling said galvanic current with a current amplitude that is between (i) a current amplitude of a first critical current corresponding to a first quantum state of the qubit and (ii) a current amplitude of a second critical current corresponding to a second quantum state of the qubit, wherein the current amplitude of the first critical current is smaller than the current amplitude of the second critical current.

6. The method of claim 1, wherein the determining comprises:
   identifying the quantum state of the qubit as being exclusively in a first quantum state when the voltage is a first value, and
   identifying the quantum state of the qubit as being exclusively in a second quantum state when the voltage is high.

7. The method of claim 1, wherein the determining comprises:
   identifying the quantum state of the qubit as being exclusively in a first quantum state when a time-correlated voltage pulse is measured, and
   identifying the quantum state of the qubit as being exclusively in a second quantum state when no time-correlated voltage pulse is measured.

8. A method of initializing a qubit, comprising:
   grounding the qubit to form a closed circuit; and
   applying a current in a selected direction across the qubit.

9. The method of claim 8, wherein the qubit has a first quantum state corresponding to a first critical current of the qubit and a second quantum state corresponding to a second critical current of the qubit.

10. The method of claim 8, wherein the qubit is a phase qubit.

11. The method of claim 8, wherein the applying comprises:
    supplying the current for an amount of time sufficient for the qubit to relax into a selected quantum state.

12. The method of claim 8, wherein the applying comprises:
    supplying the current, and
    ramping the current to zero so that the state of the qubit relaxes into a selected state.

13. The method of claim 8, wherein the grounding comprises:
    coupling the qubit to ground through a switch.

* * * * *